US012676269B2

(12) United States Patent
Tanaka et al.

(10) Patent No.: US 12,676,269 B2
(45) Date of Patent: Jul. 7, 2026

(54) OPERATING DEVICE OF HUMAN-POWERED VEHICLE

(71) Applicant: SHIMANO INC., Sakai City (JP)

(72) Inventors: Kentaro Tanaka, Sakai City (JP); Yuya Ishibashi, Sakai City (JP); Yasuyuki Komada, Sakai City (JP)

(73) Assignee: SHIMANO INC., Sakai (JP)

( * ) Notice: Subject to any disclaimer, the term of this patent is extended or adjusted under 35 U.S.C. 154(b) by 400 days.

(21) Appl. No.: 18/489,824

(22) Filed: Oct. 18, 2023

(65) Prior Publication Data

US 2024/0412930 A1      Dec. 12, 2024

Related U.S. Application Data

(63) Continuation-in-part of application No. 18/330,307, filed on Jun. 6, 2023, now abandoned.

(51) Int. Cl.
| | |
|---|---|
| *H01H 21/22* | (2006.01) |
| *B62K 23/06* | (2006.01) |
| *H01H 21/36* | (2006.01) |

(52) U.S. Cl.
CPC ............. *H01H 21/22* (2013.01); *B62K 23/06* (2013.01); *H01H 21/36* (2013.01)

(58) Field of Classification Search
CPC .. H01H 21/22; H01H 21/36; H01H 2009/068;

H01H 13/20; H01H 9/18; H01H 9/54; H01H 13/10; H01H 13/14; B62K 23/06; B62K 23/02; B62K 21/26; B62M 25/08; B62J 11/13
USPC ........................................................ 200/335
See application file for complete search history.

(56) References Cited

U.S. PATENT DOCUMENTS

| | | | |
|---|---|---|---|
| 2022/0172912 A1 | 6/2022 | Kosaka et al. | |
| 2023/0078660 A1 | 3/2023 | Kosaka | |
| 2025/0033724 A1* | 1/2025 | Chiya .................... | B62K 23/06 |
| 2025/0162681 A1* | 5/2025 | Kosaka .................. | B62M 25/08 |

* cited by examiner

*Primary Examiner* — Lheiren Mae A Caroc
(74) *Attorney, Agent, or Firm* — MORI & WARD, LLP

(57) ABSTRACT

An operating device includes a base, a first electric switch, a second electric switch, a third electric switch, a first operating structure, and a second operating structure. The first operating structure is movably arranged with respect to the base to activate the first electric switch as the first operating structure moves from a first rest position to a first intermediate position and to activate the third electric switch as the first operating structure moves from the first intermediate position to a first operating position. The second operating structure is movably arranged with respect to the base to activate the second electric switch as the second operating structure moves from a second rest position to a second intermediate position and to activate the third electric switch as the second operating structure moves from the second intermediate position to a second operating position.

28 Claims, 29 Drawing Sheets

| FIRST OPERATING STRUCTURE | SECOND OPERATING STRUCTURE | FIRST ELECTRIC SWITCH | THIRD ELECTRIC SWITCH | SECOND ELECTRIC SWITCH | CONTROL SIGNAL |
|---|---|---|---|---|---|
| P10 | | OFF | OFF | OFF | |
| P11 | | ON | OFF | OFF | CS11 |
| P12 | | ON | ON | OFF | CS12 |
| | P20 | OFF | OFF | OFF | |
| | P21 | OFF | OFF | ON | CS21 |
| | P22 | OFF | ON | ON | CS22 |

*FIG. 18*

| STROKE LENGTH | FIRST OPERATING STRUCTURE | SECOND OPERATING STRUCTURE | FIRST ELECTRIC SWITCH | THIRD ELECTRIC SWITCH | SECOND ELECTRIC SWITCH | CONTROL SIGNAL |
|---|---|---|---|---|---|---|
| FIRST SHORTER STROKE LENGTH | P10 | | OFF | OFF | OFF | |
| | P11 | | ON | OFF | OFF | CS11 |
| FIRST LONGER STROKE LENGTH | P10 | | OFF | OFF | OFF | |
| | P11 | | ON | OFF | OFF | CS11 |
| | P12 | | ON | ON | OFF | CS12 |
| SECOND SHORTER STROKE LENGTH | | P20 | OFF | OFF | OFF | |
| | | P21 | OFF | OFF | ON | CS21 |
| SECOND LONGER STROKE LENGTH | | P20 | OFF | OFF | OFF | |
| | | P21 | OFF | OFF | ON | CS21 |
| | | P22 | OFF | ON | ON | CS22 |

*FIG. 29*

OPERATING DEVICE OF HUMAN-POWERED VEHICLE

CROSS-REFERENCE TO RELATED APPLICATIONS

The present application is a continuation-in-part application of U.S. patent application Ser. No. 18/330,307 filed Jun. 6, 2023. The contents of this application are incorporated herein by reference in their entirety.

BACKGROUND

Technical Field

The present invention relates to an operating device of a human-powered vehicle.

Background Information

A human-powered vehicle includes an operating unit including at least one switch device configured to operate at least one operated unit. One of objects of the present disclosure is to improve the usability of an operating device.

SUMMARY

In accordance with a first aspect of the present invention, an operating device of a human-powered vehicle comprises a base, a first electric switch, a second electric switch, a third electric switch, a first operating structure, and a second operating structure. The first electric switch is provided to the base. The second electric switch is provided to the base. The third electric switch is provided to the base. The first operating structure is movably arranged with respect to the base to activate the first electric switch as the first operating structure moves from a first rest position to a first intermediate position and to activate the third electric switch as the first operating structure moves from the first intermediate position to a first operating position. The second operating structure is movably arranged with respect to the base to activate the second electric switch as the second operating structure moves from a second rest position to a second intermediate position and to activate the third electric switch as the second operating structure moves from the second intermediate position to a second operating position.

With the operating device according to the first aspect, it is possible to activate the first electric switch, the second electric switch, or the third electric switch using the first operating structure or the second operating structure. Thus, it is possible to generate signals using the first operating structure and the second operating structure, improving the usability of the operating device.

In accordance with a second aspect of the present invention, the operating device according to the first aspect is configured so that the first operating structure is movably arranged with respect to the base to activate the third electric switch as the first operating structure moves from the first intermediate position to the first operating position of the first operating structure while the first electric switch remains activated.

With the operating device according to the second aspect, it is possible to activate only the first electric switch and both the first electric switch and the third electric switch using the first operating structure. Thus, it is possible to improve the usability of the operating device.

In accordance with a third aspect of the present invention, the operating device according to the first or second aspect is configured so that the second operating member is movably arranged with respect to the base to activate the third electric switch as the second operating structure moves from the second intermediate position to the second operating position of the second operating structure while the second electric switch remains activated.

With the operating device according to the third aspect, it is possible to activate only the second electric switch and both the second electric switch and the third electric switch using the second operating structure. Thus, it is possible to improve the usability of the operating device.

In accordance with a fourth aspect of the present invention, the operating device according to any one of the first to third aspects is configured so that the first operating structure includes a first operating member and a first activating member. The first activating member is movable relative to the base as the first operating member moves from the first rest position to the first intermediate position.

With the operating device according to the fourth aspect, it is possible to activate the first electric switch using the first operating member and the first activating member, improving the design flexibility of the first operating structure.

In accordance with a fifth aspect of the present invention, the operating device according to any one of the first to third aspects is configured so that the second operating structure includes a second operating member and a second activating member. The second activating member is movable relative to the base as the second operating member moves from the second rest position to the second intermediate position.

With the operating device according to the fifth aspect, it is possible to activate the second electric switch using the second operating member and the second activating member, improving the design flexibility of the second operating structure.

In accordance with a sixth aspect of the present invention, the operating device according to the fourth or fifth aspect further comprises an additional activating member movably arranged with respect to the base. The additional activating member is movable relative to the base from a third rest position to a third operating position as the first operating member moves from the first intermediate position to the first operating position.

With the operating device according to the sixth aspect, it is possible to activate the third electric switch using the first operating member and the additional activating member. Thus, it is possible to improve the usability of the operating device with a comparatively simple structure.

In accordance with a seventh aspect of the present invention, the operating device according to the sixth aspect is configured so that the additional activating member is movable relative to the base from the third rest position to the third operating position as the second operating member moves from the second intermediate position to the second operating position.

With the operating device according to the seventh aspect, it is possible to activate the third electric switch using the second operating member and the additional activating member. Thus, it is possible to improve the usability of the operating device with a comparatively simple structure.

In accordance with an eighth aspect of the present invention, the operating device according to the sixth or seventh aspect is configured so that the first operating member is movably arranged with respect to the base to activate the first electric switch via the first activating member as the first operating member moves from the first rest position to the first intermediate position and to activate the third electric switch via the additional activating member as the first operating member moves from the first intermediate position to the first operating position.

With the operating device according to the eighth aspect, it is possible to activate at least one of the first electric switch and the third electric switch by moving the first operating member. Thus, it is possible to improve the usability of the operating device with a comparatively simple structure.

In accordance with a ninth aspect of the present invention, the operating device according to any one of the sixth to eighth aspects is configured so that the second operating member is movably arranged with respect to the base to activate the second electric switch via the second activating member as the second operating member moves from the second rest position to the second intermediate position and to activate the third electric switch via the additional activating member as the second operating member moves from the second intermediate position to the second operating position.

With the operating device according to the ninth aspect, it is possible to activate at least one of the second electric switch and the third electric switch by moving the second operating member. Thus, it is possible to improve the usability of the operating device with a comparatively simple structure.

In accordance with a tenth aspect of the present invention, the operating device according to any one of the sixth to ninth aspects is configured so that the first operating structure includes a first activation portion. The second operating structure includes a second activation portion. The additional activating member includes an additional activation portion. The first activation portion is movable toward the first electric switch as the first operating structure moves from the first rest position to the first intermediate position. The second activation portion is movable toward the second electric switch as the second operating structure moves from the second rest position to the second intermediate position. The additional activation portion is movable toward the third electric switch as the first operating structure moves from the first intermediate position to the first operating position. The additional activation portion is movable toward the third electric switch as the second operating structure moves from the second intermediate position to the second operating position.

With the operating device according to the tenth aspect, it is possible to reliably activate the first electric switch, the second electric switch, and the third electric switch.

In accordance with an eleventh aspect of the present invention, the operating device according to any one of the sixth to tenth aspects is configured so that the first operating member is pivotally coupled to the base about a first pivot axis. The first activating member is pivotally coupled to the base about a first additional pivot axis.

With the operating device according to the eleventh aspect, it is possible to activate the first electric switch and the third electric switch using pivotal movements of the first operating member and the first activating member.

In accordance with a twelfth aspect of the present invention, the operating device according to the eleventh aspect is configured so that the first additional pivot axis is offset from the first pivot axis.

With the operating device according to the twelfth aspect, it is possible to improve the flexibility of arrangement of the first operating member and the first activating member.

In accordance with a thirteenth aspect of the present invention, the operating device according to the eleventh or twelfth aspect is configured so that the additional activating member is pivotally coupled to the base about a third pivot axis. The third pivot axis is coincident with the first additional pivot axis.

With the operating device according to the thirteenth aspect, it is possible to activate the third electric switch using a pivotal movement of the additional activating member.

In accordance with a fourteenth aspect of the present invention, the operating device according to any one of the sixth to thirteenth aspects is configured so that the second operating member is pivotally coupled to the base about a second pivot axis. The second activating member is pivotally coupled to the base about a second additional pivot axis.

With the operating device according to the fourteenth aspect, it is possible to activate the second electric switch and the third electric switch using pivotal movements of the second operating member and the second activating member.

In accordance with a fifteenth aspect of the present invention, the operating device according to the fourteenth aspect is configured so that the second additional pivot axis is offset from the second pivot axis.

With the operating device according to the fifteenth aspect, it is possible to improve the flexibility of arrangement of the second operating member and the second activating member.

In accordance with a sixteenth aspect of the present invention, the operating device according to the fourteenth or fifteenth aspect is configured so that the first operating member is pivotally coupled to the base about a first pivot axis. The first activating member is pivotally coupled to the base about a first additional pivot axis. The first pivot axis is coincident with the second pivot axis.

With the operating device according to the sixteenth aspect, it is possible to simplify the first operating structure and the second operating structure.

In accordance with a seventeenth aspect of the present invention, the operating device according to the sixteenth aspect is configured so that the first additional pivot axis is parallel to the first pivot axis.

With the operating device according to the seventeenth aspect, it is possible to simplify the first operating structure.

In accordance with an eighteenth aspect of the present invention, the operating device according to the sixteenth or seventeenth aspect is configured so that the additional activating member is pivotally coupled to the base about a third pivot axis. The third pivot axis is coincident with at least one of the first additional pivot axis and the second additional pivot axis.

With the operating device according to the eighteenth aspect, it is possible to simplify at least one of the first operating structure, the second operating structure, and the additional activating member.

In accordance with a nineteenth aspect of the present invention, the operating device according to any one of the sixth to eighteenth aspects is configured so that the first operating structure includes a first operating member and a first activating member. The second operating structure includes a second operating member and a second activating member. The additional activating member is movable with respect to the base in response to a movement of the first operating member. The additional activating member is movable with respect to the base in response to a movement of the second operating member.

With the operating device according to the nineteenth aspect, it is possible to move the additional activating member using the first operating member and the second operating member. Thus, it is possible to improve the usability of the operating device with a comparatively simple structure.

In accordance with a twentieth aspect of the present invention, the operating device according to the nineteenth aspect is configured so that the first activating member includes a first contacting part. The first operating member includes a second contacting part. The additional activating member includes an additional contacting part. The first contacting part is contactable with the second contacting part in response to the movement of the first operating member. The additional contacting part is contactable with the second contacting part in response to the movement of the first operating member.

With the operating device according to the twentieth aspect, it is possible to reliably move the first activating member and the additional activating member using the first operating member.

In accordance with a twenty-first aspect of the present invention, the operating device according to the twentieth aspect is configured so that the second activating member includes a third contacting part. The second operating member includes a fourth contacting part. The third contacting part is contactable with the fourth contacting part in response to the movement of the second operating member. The additional contacting part is contactable with the fourth contacting part in response to the movement of the second operating member.

With the operating device according to the twenty-first aspect, it is possible to reliably move the second activating member and the additional activating member using the second operating member.

In accordance with a twenty-second aspect of the present invention, the operating device according to any one of the sixth to twenty-first aspects is configured so that the first operating structure is at least partially spaced apart from the second operating structure in an arrangement direction. The additional activating member is at least partially provided between the first operating structure and the second operating structure in the arrangement direction.

With the operating device according to the twenty-second aspect, it is possible to make the size of the first operating structure and the second operating structure comparatively small.

In accordance with a twenty-third aspect of the present invention, the operating device according to the first to twenty-second aspect is configured so that the first operating structure is movable relative to the base independently from the second operating structure between the first rest position and the first operating position without moving the second operating structure. The second operating structure is movable relative to the base independently from the first operating structure between the second rest position and the second operating position without moving the first operating structure.

With the operating device according to the twenty-third aspect, it is possible to reliably activate the first electric switch, the second electric switch, and the third electric switch using the first operating structure and the second electric structure.

In accordance with a twenty-fourth aspect of the present invention, the operating device according to any one of the first to twenty-third aspects is configured so that the first operating structure is at least partially spaced apart from the second operating structure in an arrangement direction. The first electric switch, the second electric switch, and the third electric switch are arranged in the arrangement direction.

With the operating device according to the twenty-fourth aspect, it is possible to make the size of the operating device comparatively small.

In accordance with a twenty-fifth aspect of the present invention, the operating device according to any one of the first to twenty-fourth aspects further comprises electronic circuitry. The electronic circuitry is configured to be electrically connected to the first electric switch, the second electric switch, and the third electric switch. The first operating structure includes a first user input member and a first pivot axis. The second operating structure includes a second user input member. The electronic circuitry is offset from at least one of the first user input member and the second user input member in an axial direction defined along the first pivot axis.

With the operating device according to the twenty-fifth aspect, it is possible to improve flexibility of arrangement of the electronic circuitry and the at least one of the first user input member and the second user input member in comparison with a case where the electronic circuitry is not offset from the at least one of the first user input member and the second user input member in the axial direction.

In accordance with a twenty-sixth aspect of the present invention, the operating device according to any one of the first to twenty-fifth aspects is configured so that the first operating structure includes a first user input member and a first pivot axis. The second operating structure includes a second user input member. The electronic circuitry is overlapped with at least one of the first user input member and the second user input member in an axial direction defined along the first pivot axis.

With the operating device according to the twenty-sixth aspect, it is possible to efficiently arrange the electronic circuitry and the at least one of the first user input member and the second user input member in the axial direction.

In accordance with a twenty-seventh aspect of the present invention, the operating device according to any one of first to twenty-sixth aspects further comprises a stroke changer configured to change at least one of a first stroke length of the first operating structure and a second stroke length of the second operating structure.

With the operating device according to the twenty-seventh aspect, it is possible to improve usability of the operating device.

In accordance with a twenty-eighth aspect of the present invention, the operating device according to the twenty-seventh aspect is configured so that the first stroke length includes a first shorter stroke length and a first longer stroke length. The first shorter stroke length is defined between the first rest position and the first intermediate position. The first longer stroke length is defined between the first rest position and the first operating position. The stroke changer is configured to change the first stroke length between the first shorter stroke length and the first longer stroke length.

With the operating device according to the twenty-eighth aspect, it is possible to reliably improve usability of the operating device.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIG. 18 is a relationship between a position of a first operating structure, a position of a second operating structure, a first electric switch, a second electric switch, a third electric switch, and control signals of the operating device illustrated in FIG. 1.

FIG. 29 is a relationship between a position of a first operating structure, a position of a second operating structure, a first electric switch, a second electric switch, a third electric switch, and control signals of the operating device in accordance with the third modification.

DESCRIPTION OF THE EMBODIMENTS

Figure 1:
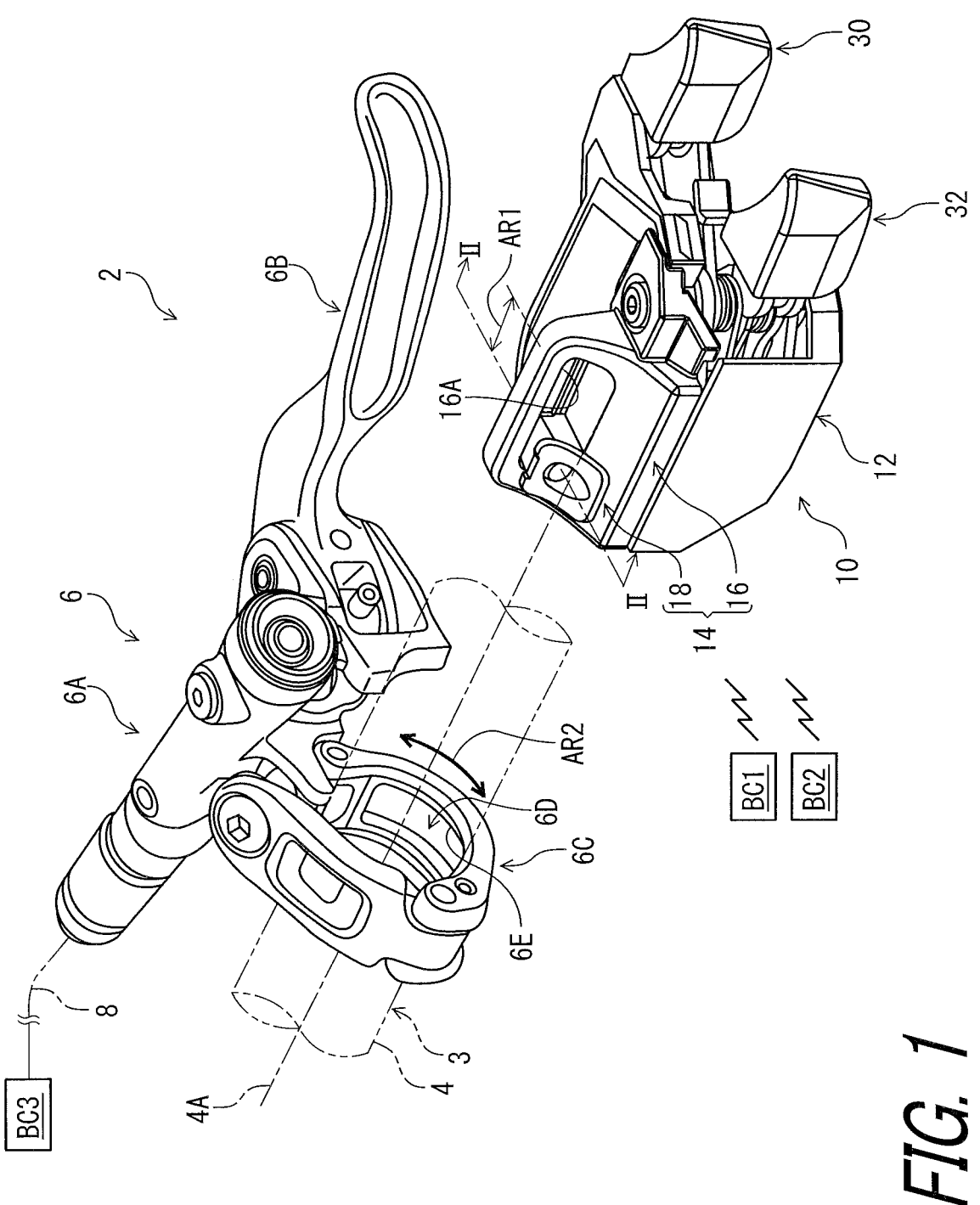
FIG. 1 is a perspective view of an operating device in accordance with one of embodiments and an additional operating device of a human-powered vehicle.

The embodiments will now be described with reference to the accompanying drawings, wherein like reference numerals designate corresponding or identical elements throughout the various drawings.

As seen in FIG. 1, an operating device 10 of a human-powered vehicle 2 is configured to operate at least one device. The operating device 10 is configured to be mounted to a vehicle body 3 of the human-powered vehicle 2. The operating device 10 is configured to be mounted to a tubular part 4 of the vehicle body 3 of the human-powered vehicle 2.

In the present application, the term "human-powered vehicle" includes a vehicle to travel with a motive power including at least a human power of a user who rides the vehicle. The human-powered vehicle includes a various kind of bicycles such as a mountain bike, a road bike, a city bike, a cargo bike, a hand bike, and a recumbent bike. Furthermore, the human-powered vehicle includes an electric bike called as an E-bike. The electric bike includes an electrically assisted bicycle configured to assist propulsion of a vehicle with an electric motor. However, a total number of wheels of the human-powered vehicle is not limited to two. For example, the human-powered vehicle includes a vehicle having one wheel or three or more wheels. Especially, the human-powered vehicle does not include a vehicle that uses only a driving source as motive power. Examples of the driving source include an internal-combustion engine and an electric motor. Generally, a light road vehicle, which includes a vehicle that does not require a driver's license for a public road, is assumed as the human-powered vehicle.

In the present application, the following directional terms "front," "rear," "forward," "rearward," "left," "right," "transverse," "upward" and "downward" as well as any other similar directional terms refer to those directions which are determined on the basis of the user who is in the user's standard position in the human-powered vehicle 2 with facing a handlebar or steering. Examples of the user's standard position include a saddle and a seat. Accordingly, these terms, as utilized to describe the operating device 10 or other devices, should be interpreted relative to the human-powered vehicle 2 equipped with the operating device 10 or other devices as used in an upright riding position on a horizontal surface.

The operating device 10 is configured to be electrically connected to an electric device BC1. In the present embodiment, the operating device 10 is configured to be connected to the electric device BC1 via a wireless communication channel. The operating device 10 is configured to be wirelessly connected to the electric device BC1. However, the operating device 10 can be configured to be connected to the electric device BC1 or other devices via an electric cable if needed or desired.

The operating device 10 is configured to be electrically connected to an electric device BC2. In the present embodiment, the operating device 10 is configured to be connected to the electric device BC2 via a wireless communication channel. The operating device 10 is configured to be wirelessly connected to the electric device BC2. However, the operating device 10 can be configured to be connected to the electric device BC2 or other devices via an electric cable if needed or desired.

Examples of the electric devices BC1 and BC2 include an additional or satellite operating device, an adjustable seatpost, a suspension, a gear changer, a brake device, a lighting device, an assist drive unit, a cycle computer, a smartphone, a tablet computer, and a personal computer. In the present embodiment, the electric device BC1 includes a gear changer such as a derailleur. The electric device BC2 includes a gear changer such as a derailleur. However, the electric devices BC1 and BC2 are not limited to the above devices.

In the present embodiment, the operating device 10 is a right-hand side operating device configured to be operated by the rider's right hand to actuate the electric devices BC1 and BC2 or other devices. However, the structures of the operating device 10 can be applied to a left-hand side operating device.

The human-powered vehicle 2 includes an additional operating device 6. The additional operating device 6 is configured to operate at least one device. The additional operating device 6 is configured to be mounted to the tubular part 4 of the human-powered vehicle 2. The additional operating device 6 includes an operating body 6A, an operating lever 6B, and a mounting member 6C. The operating lever 6B is pivotally coupled to the operating body 6A. For example, the operating body 6A includes a hydraulic unit configured to generate a hydraulic pressure in response to a movement of the operating lever 6B. However, the operating body 6A can include structures (e.g., a wire take-up unit configured to take up or release a wire of a mechanical cable) other than the hydraulic unit if needed or desired.

The mounting member 6C is configured to couple the operating body 6A to the tubular part 4 of the human-powered vehicle 2. The mounting member 6C includes a mounting opening 6D through which the tubular part 4 of the human-powered vehicle 2 extends in a state where the mounting member 6C couples the operating body 6A to the tubular part 4 of the human-powered vehicle 2. In the present embodiment, the mounting member 6C includes a clamp. However, the structure of the mounting member 6C is not limited to the clamp.

The additional operating device 6 is configured to be connected to an additional device BC3. In the present embodiment, the additional operating device 6 is configured to be connected to the additional device BC3 via a hydraulic hose 8. However, the additional operating device 6 can be configured to be connected to the additional device BC3 via other elements such as a mechanical cable and an electric cable. Examples of the mechanical cable include a Bowden cable.

Examples of the additional device BC3 include an adjustable seatpost, a suspension, an assist drive unit, a gear changer, and a brake device. In the present embodiment, the additional device BC3 includes a hydraulic brake device. However, the additional device BC3 is not limited to the above devices.

As seen in FIG. 1, the operating device 10 of the human-powered vehicle 2 comprises a base 12. The base 12 is mountable to the vehicle body 3 of the human-powered vehicle 2. The base 12 is mountable to the tubular part 4 of the vehicle body 3. The tubular part 4 has a longitudinal center axis 4A. The tubular part 4 of the human-powered vehicle 2 extends along the longitudinal center axis 4A.

The operating device 10 further comprises a mounting structure 14. The mounting structure 14 is configured to couple the base 12 and the mounting member 6C of the additional operating device 6. The mounting structure 14 is configured to couple the base 12 and the tubular part 4 of the vehicle body 3 via the mounting member 6C of the additional operating device 6. In the present embodiment, the operating device 10 is configured to be mounted to a flat handlebar. However, the mounting structure 14 can be configured to couple the base 12 and other type of handlebars such as a drop-down handlebar, a time trial handlebar, and a bull horn handlebar if needed or desired. The mounting structure 14 can have a structure configured to directly couple the base 12 and the tubular part 4 of the vehicle body 3 if needed or desired.

As seen in FIG. 1, the mounting structure 14 includes a mounting base 16 and an adjustment member 18. The mounting base 16 is secured to the base 12. The adjustment member 18 is adjustably attached to the mounting base 16 and is configured to adjustably couple the mounting base 16 and the mounting member 6C. In the present embodiment, the mounting structure 14 is configured to couple the base 12 and the vehicle body 3 such that the base 12 is positioned in any position within an adjustable range AR1. The mounting structure 14 is configured to couple the base 12 and the vehicle body 3 such that the base 12 is positioned in any position within an additional adjustable range AR2. However, the mounting structure 14 can be configured to couple the base 12 and the vehicle body 3 such that the base 12 is positioned in any position within only one of the adjustable range AR1 and the additional adjustable range AR2 if needed or desired.

Figure 2:
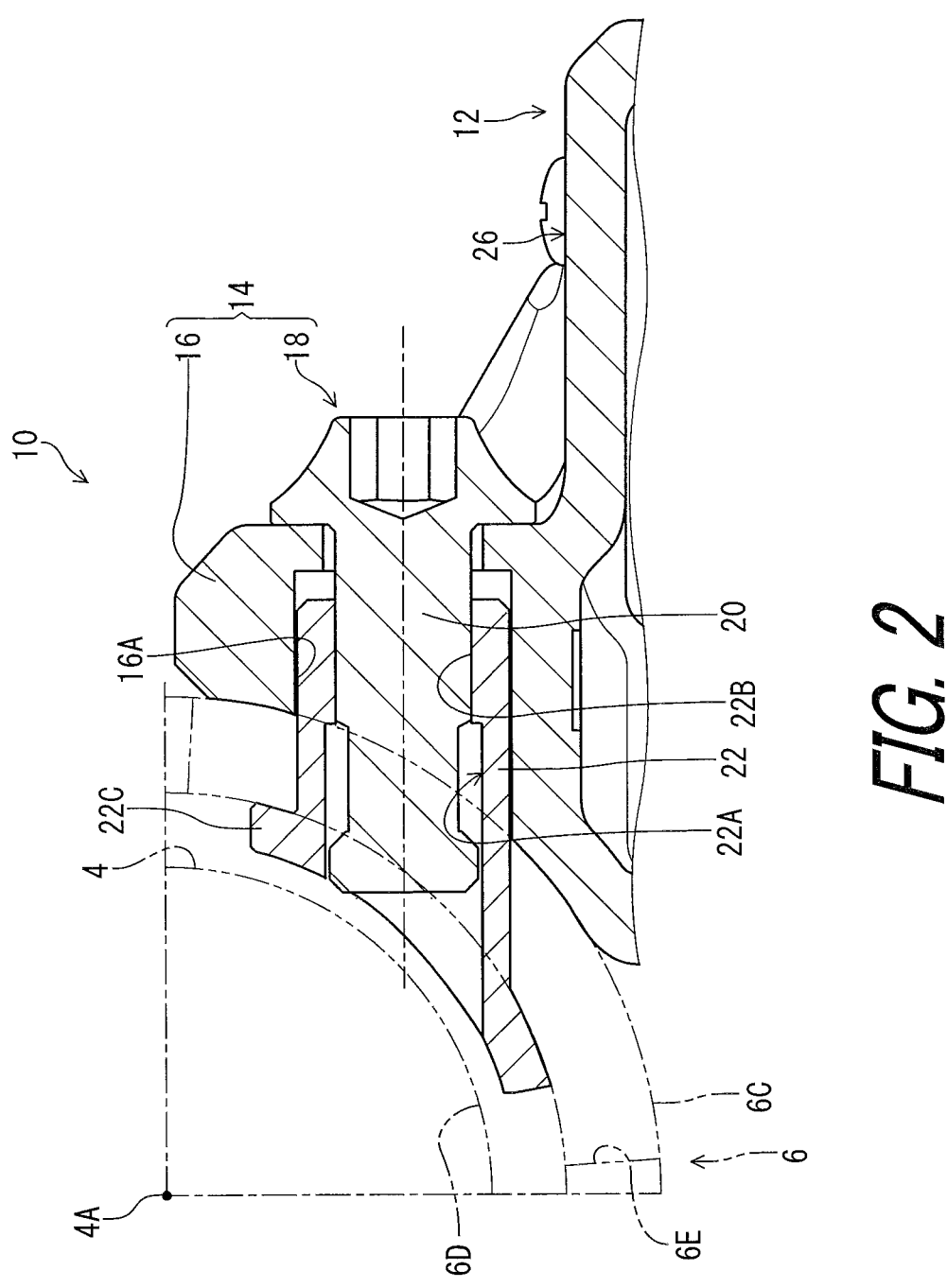
FIG. 2 is a cross-sectional view of the operating device taken along line II-II of FIG. 1.

As seen in FIG. 2, the mounting base 16 is integrally provided with at least part of the base 12 as a one-piece unitary member. The adjustment member 18 is a separate member from the mounting base 16. The mounting base 16 includes an elongated opening 16A. The adjustment member 18 is movably provided in the elongated opening 16A. The mounting base 16 can be a separate member from at least part of the base 12 if needed or desired.

As seen in FIG. 1, the adjustment member 18 extends through the elongated opening 16A in a mounting state where the base 12 is fastened to the vehicle body 3 by the mounting structure 14. The adjustment member 18 is movable relative to the base 12 within the elongated opening 16A in a state where the base 12 is not fastened to the vehicle body 3 by the mounting structure 14. The elongated opening 16A of the mounting base 16 defines the adjustable range AR1. The elongated opening 16A extends along the longitudinal center axis 4A of the tubular part 4.

The mounting member 6C includes an additional elongated opening 6E. The adjustment member 18 is configured to be movably provided in the additional elongated opening 6E. The adjustment member 18 is provided in the elongated opening 16A and the additional elongated opening 6E in the mounting state where the base 12 is coupled to the vehicle body 3 by the mounting structure 14. The adjustment member 18 is movable relative to the mounting member 6C of the additional operating device 6 within the additional elongated opening 6E in the state where the base 12 is not fastened to the vehicle body 3 by the mounting structure 14. The additional elongated opening 6E of the mounting member 6C defines the additional adjustable range AR2. The additional elongated opening 6E extends along an outer peripheral surface of the tubular part 4 of the vehicle body 3 about the longitudinal center axis 4A.

As seen in FIG. 2, the adjustment member 18 includes an adjustment screw 20 and an adjustment member 22. The adjustment member 22 includes a through hole 22A having an adjustment threaded hole 22B. The adjustment screw 20 is threadedly engaged with the adjustment threaded hole 22B of the adjustment member 22. The adjustment member 22 includes a flange part 22C. The mounting member 6C of the additional operating device 6 is held between the mounting base 16 and the flange part 22C of the adjustment member 22. However, the structure of the adjustment member 18 is not limited to the illustrated structure.

Figure 3:
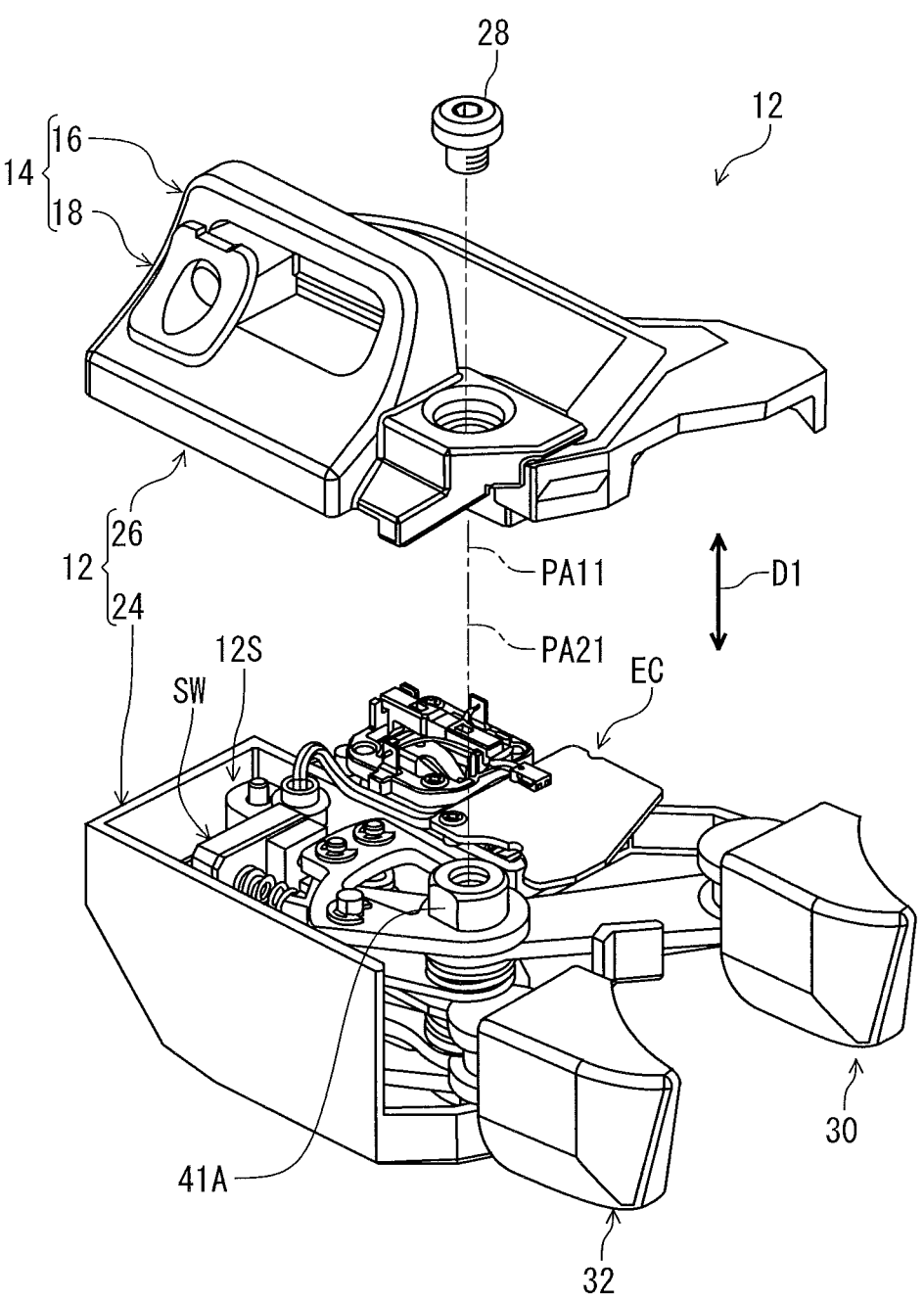
FIG. 3 is an exploded perspective view of the operating device illustrated in FIG. 1.

As seen in FIG. 3, the base 12 includes a first base 24 and a second base 26. The second base 26 is secured to the first base 24 with a fastener 28. The base 12 includes an internal space 12S defined by the first base 24 and the second base 26. The mounting structure 14 is provided to the second base 26.

In the present embodiment, the first base 24 is integrally provided as a one-piece unitary member. The second base 26 includes at least two separate members. However, the first base 24 can include at least two separate members if needed or desired. The second base 26 is integrally provided as a one-piece unitary member if needed or desired.

Figure 4:
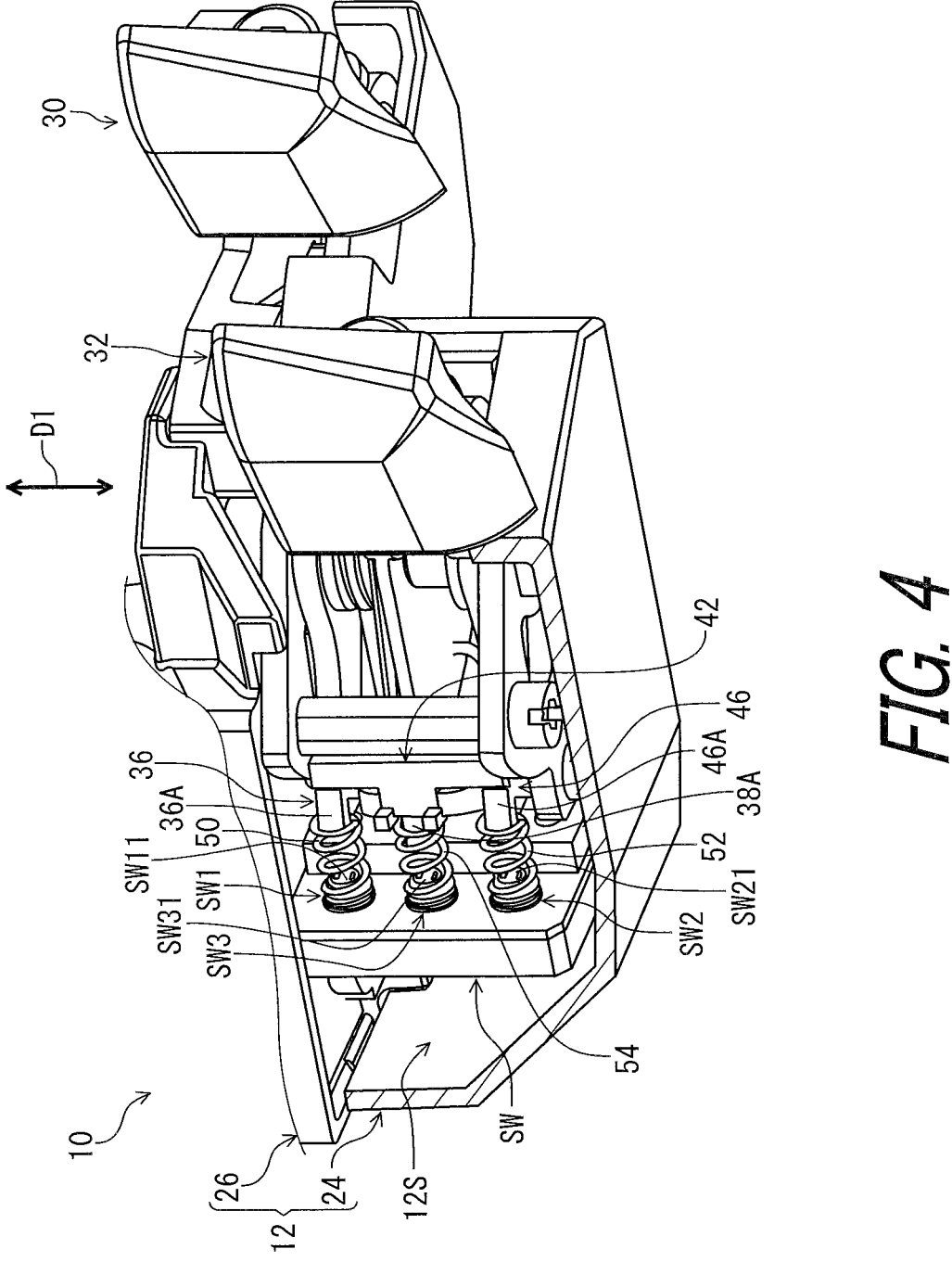
FIG. 4 is a partial perspective cross-sectional view of the operating device illustrated in FIG. 1.

As seen in FIG. 4, the operating device 10 of the human-powered vehicle 2 comprises a first electric switch SW1, a second electric switch SW2, and a third electric switch SW3. The first electric switch SW1, the second electric switch SW2, and the third electric switch SW3 are integrally provided as a switch unit SW. The switch unit SW is detachably and reattachably secured to the base 12 with fasteners such as screws. However, at least one of the first electric switch SW1, the second electric switch SW2, and the third electric switch SW3 can be a separate unit from another of the first electric switch SW1, the second electric switch SW2, and the third electric switch SW3 if needed or desired.

The first electric switch SW1 is provided to the base 12. The second electric switch SW2 is provided to the base 12. The third electric switch SW3 is provided to the base 12. The switch unit SW is at least partially provided in the internal space 12S of the base 12. The first electric switch SW1 is at least partially provided in the internal space 12S. The second electric switch SW2 is at least partially provided in the internal space 12S. The third electric switch SW3 is at least partially provided in the internal space 12S.

In the present embodiment, the switch unit SW is entirely provided in the internal space 12S of the base 12. The first electric switch SW1 is entirely provided in the internal space 12S. The second electric switch SW2 is entirely provided in the internal space 12S. The third electric switch SW3 is entirely provided in the internal space 12S. However, the switch unit SW can be partially provided in the internal space 12S of the base 12 if needed or desired. The first electric switch SW1 can be partially provided in the internal space 12S if needed or desired. The second electric switch SW2 can be partially provided in the internal space 12S if needed or desired. The third electric switch SW3 can be partially provided in the internal space 12S if needed or desired.

Each of the first electric switch SW1, the second electric switch SW2, and the third electric switch SW3 includes a normally open switch. For example, each of the first electric switch SW1, the second electric switch SW2, and the third electric switch SW3 includes a static contact and a moving contact contactable with the static contact. The moving contact is movable toward the static contact in response to the user operation. However, each of the first electric switch SW1, the second electric switch SW2, and the third electric switch SW3 can include an electric switch other than the normally open switch if needed or desired. Each of the first electric switch SW1, the second electric switch SW2, and the third electric switch SW3 can include a power generation element such as a piezoelectric element. The power generation element is configured to generate electricity in response to the user operation. The switch unit SW can be configured to be replaceable with another switch unit including such a power generation element.

As seen in FIG. 4, the operating device 10 of the human-powered vehicle 2 comprises a first operating structure 30 and a second operating structure 32. The first operating structure 30 is movably arranged with respect to the base 12. The second operating structure 32 is movably arranged with respect to the base 12. The first operating structure 30 is movable relative to the base 12 independently from the second operating structure 32. The first operating structure 30 is movably coupled to the base 12 to activate the first electric switch SW1 or the third electric switch SW3. The second operating structure 32 is movably coupled to the base 12 to activate the second electric switch SW2 or the third electric switch SW3.

Figure 5:
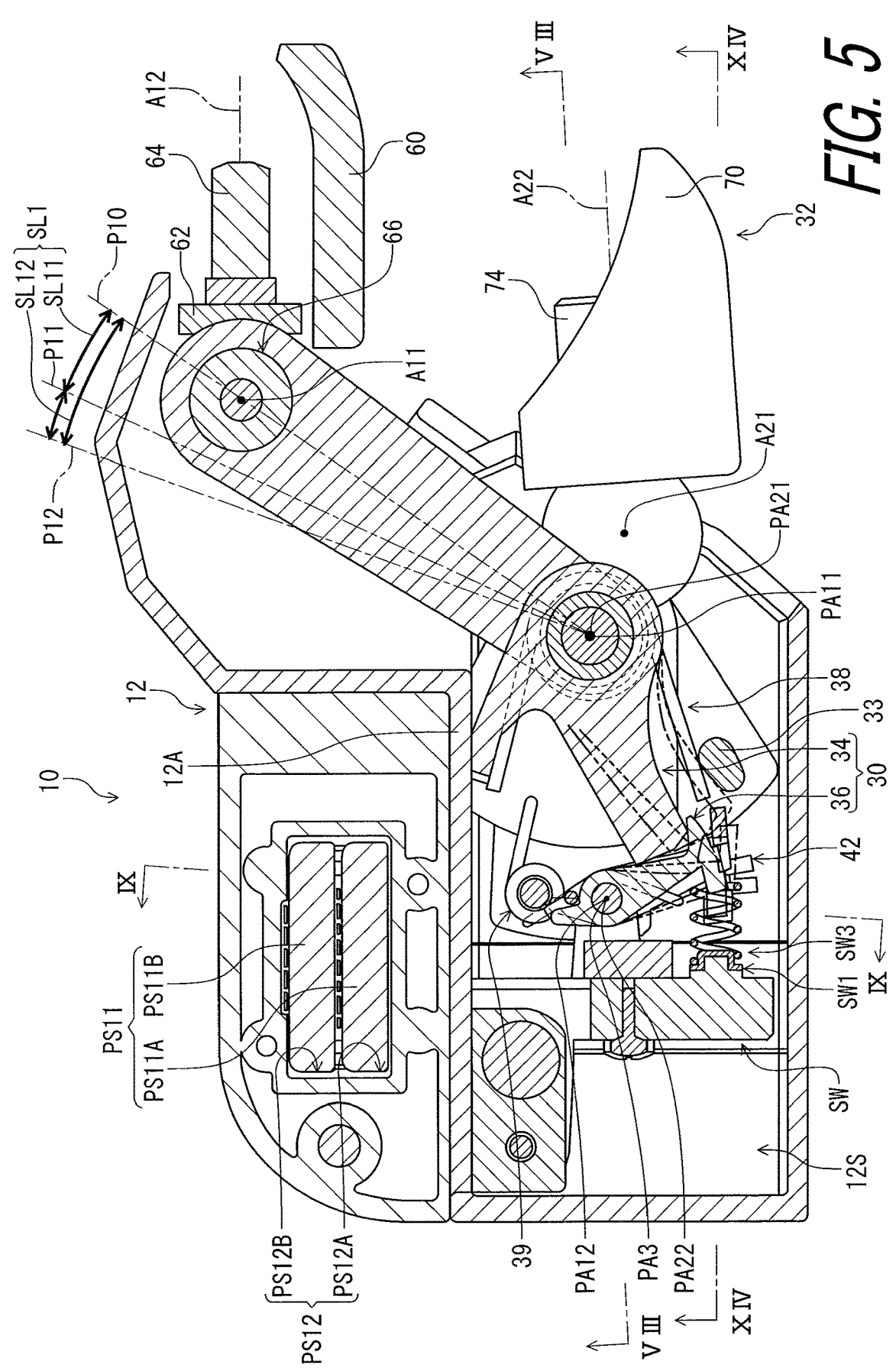
FIG. 5 is a cross-sectional view of the operating device taken along line V-V of FIG. 8.

As seen in FIG. 5, the first operating structure 30 is movably arranged with respect to the base 12 from a first rest position P10 to a first operating position P12 through a first intermediate position P11. The first intermediate position P11 is provided between the first rest position P10 and the first operating position P12. The first operating structure 30 is movable relative to the base 12 independently from the second operating structure 32 between the first rest position P10 and the first operating position P12 without moving the second operating structure 32.

The base 12 includes a stopper 12A. The first operating structure 30 is in contact with the stopper 12A in a state where the first operating structure 30 is in the first rest position P10. The operating device 10 includes a stopper 33. The first operating structure 30 is in contact with the stopper 33 in a state where the first operating structure 30 is in the first operating position P12.

The first operating structure 30 is movably arranged with respect to the base 12 to activate the first electric switch SW1 as the first operating structure 30 moves from the first rest position P10 to the first intermediate position P11. The first operating structure 30 is movably arranged with respect to the base 12 to activate the third electric switch SW3 as the first operating structure 30 moves from the first intermediate position P11 to the first operating position P12.

The first operating structure 30 includes a first operating member 34 and a first activating member 36. The first operating member 34 is movably arranged with respect to the base 12 from the first rest position P10 to the first operating position P12 via the first intermediate position P11.

Figure 6:
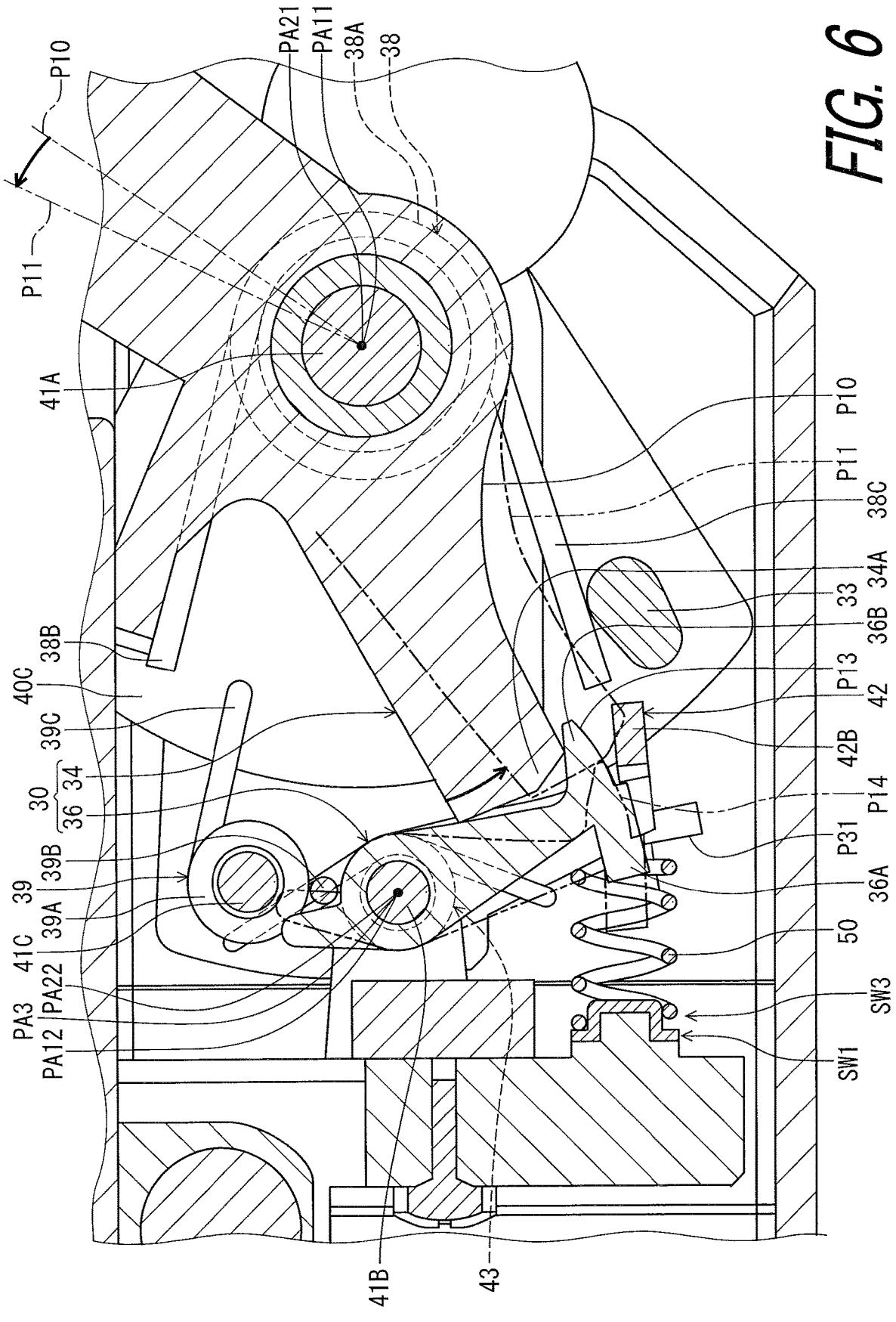
FIG. 6 is a cross-sectional view of the operating device taken along line VI-VI of FIG. 8.

As seen in FIG. 6, the first activating member 36 is movably arranged with respect to the base 12 from a first initial position P13 to a first activation position P14. The first activating member 36 does not activate the first electric switch SW1 in a state where the first activating member 36 is in the first initial position P13. The first activating member 36 activates the first electric switch SW1 in a state where the first activating member 36 is in the first activation position P14.

The operating device 10 includes a first biasing member 38. The first biasing member 38 is configured to bias the first operating structure 30 toward the first rest position P10. The first biasing member 38 is configured to bias the first operating member 34 toward the first rest position P10. The first biasing member 38 includes a first coiled portion 38A, a first end portion 38B, and a first additional end portion 38C. The first operating structure 30 includes a first pivot axis PA11. The first coiled portion 38A is provided about the first pivot axis PA11. The first shaft 41A rotatably supports the first biasing member 38 about the first pivot axis PA11.

The first end portion 38B is engaged with the first operating structure 30. The first additional end portion 38C is engaged with the stopper 33.

The operating device 10 includes a first additional biasing member 39. The first additional biasing member 39 is configured to bias the first activating member 36 toward the first initial position P13. The first additional biasing member 39 includes a first coiled portion 39A, a first end portion 39B, and a first additional end portion 39C. The first coiled portion 39A is provided about the third shaft 41C. The third shaft 41C rotatably supports the first additional biasing member 39. The first end portion 39B is engaged with the first activating member 36. The operating device 10 includes a support plate 40. The support plate 40 is secured to the base 12. The first additional end portion 39C is engaged with the support plate 40.

As seen in FIG. 6, the first activating member 36 is movable relative to the base 12 as the first operating member 34 moves from the first rest position P10 to the first intermediate position P11. The first operating member 34 moves the first activating member 36 from the first initial position P13 to the first activation position P14 as the first operating member 34 moves from the first rest position P10 to the first intermediate position P11. The first activating member 36 activates the first electric switch SW1 as the first operating member 34 moves the first activating member 36 from the first initial position P13 to the first activation position P14. Thus, the first operating member 34 is movably arranged with respect to the base 12 to activate the first electric switch SW1 via the first activating member 36 as the first operating member 34 moves from the first rest position P10 to the first intermediate position P11. Namely, the first operating structure 30 is movably arranged with respect to the base 12 to activate the first electric switch SW1 as the first operating structure 30 moves from the first rest position P10 to the first intermediate position P11 (see e.g., FIG. 18).

As seen in FIG. 6, the first operating member 34 is pivotally coupled to the base 12 about the first pivot axis PA11. The first activating member 36 is pivotally coupled to the base 12 about a first additional pivot axis PA12. The first operating member 34 is pivotable relative to the base 12 about the first pivot axis PA11 between the first rest position P10 and the first operating position P12. The first activating member 36 is pivotable relative to the base 12 about the first additional pivot axis PA12 between the first initial position P13 and the first activation position P14.

Figure 8:
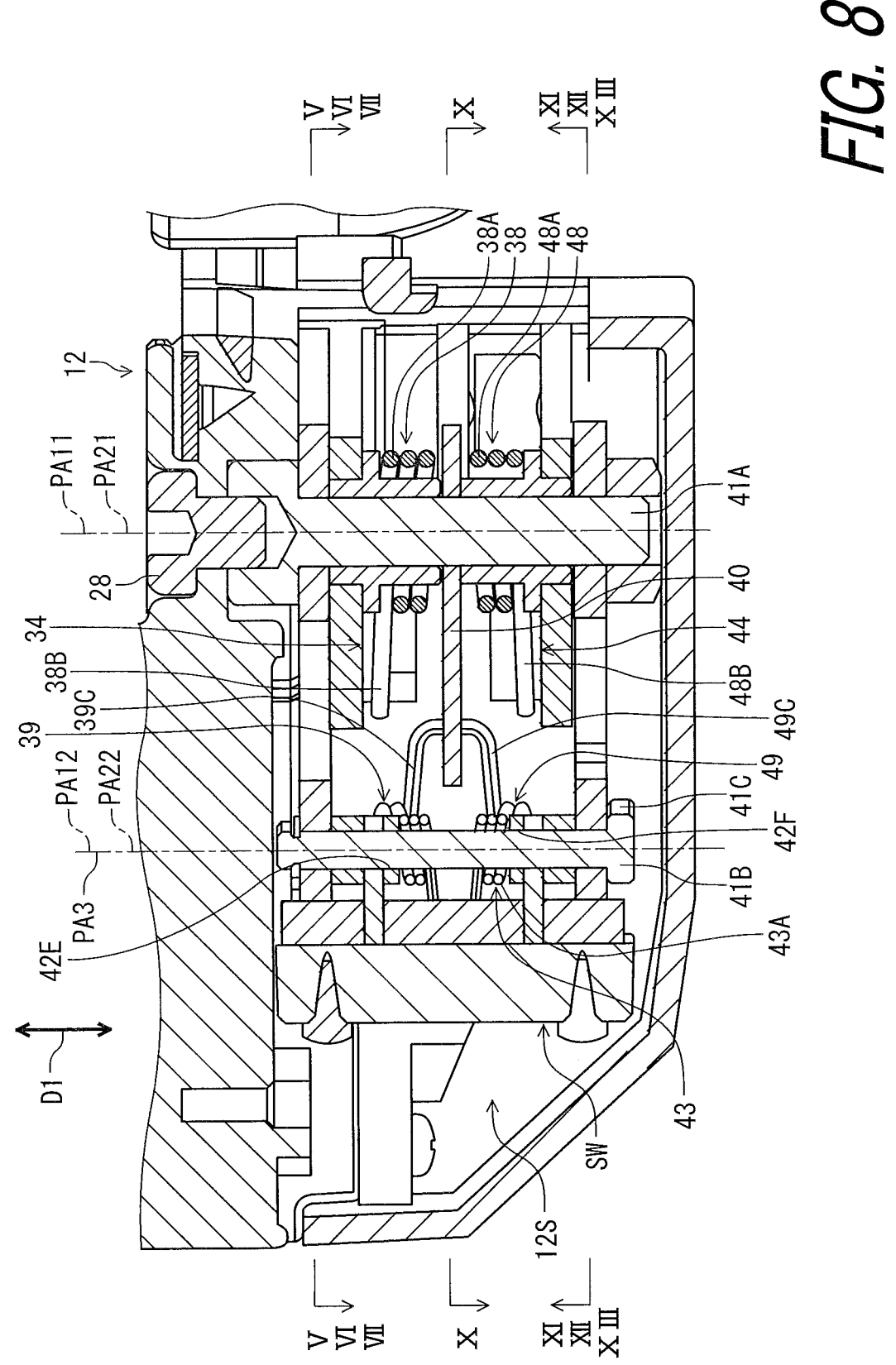
FIG. 8 is a cross-sectional view of the operating device taken along line VIII-VIII of FIG. 5.

As seen in FIG. 8, the first additional pivot axis PA12 is offset from the first pivot axis PA11. The first additional pivot axis PA12 is parallel to the first pivot axis PA11. However, the positional relationship between the first pivot axis PA11 and the first additional pivot axis PA12 is not limited to the illustrated embodiment. The first additional pivot axis PA12 can be coincident with the first pivot axis PA11 if needed or desired. The first additional pivot axis PA12 can be non-parallel to the first pivot axis PA11 if needed or desired.

The operating device 10 includes a first shaft 41A and a second shaft 41B. The first shaft 41A rotatably supports the first operating member 34 about the first pivot axis PA11. The second shaft 41B rotatably supports the first activating member 36 about the first additional pivot axis PA12. The first shaft 41A extends along the first pivot axis PA11. The second shaft 41B extends along the first additional pivot axis PA12. The first coiled portion 38A of the first biasing member 38 is provided about the first shaft 41A. The first shaft 41A rotatably supports the first biasing member 38 about the first pivot axis PA11.

Figure 9:
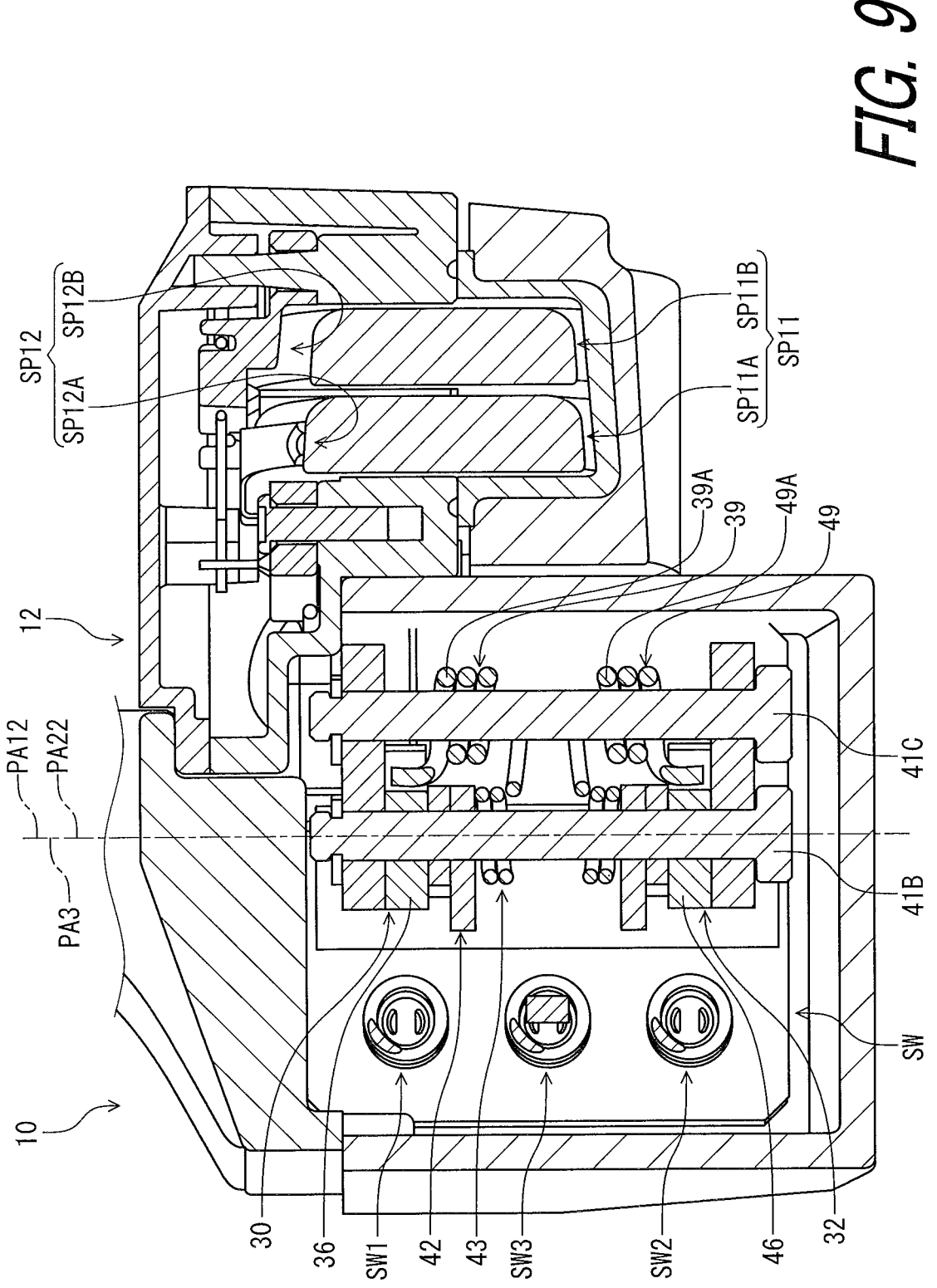
FIG. 9 is a cross-sectional view of the operating device taken along line IX-IX of FIG. 5.

As seen in FIG. 9, the operating device 10 includes a third shaft 41C. The first coiled portion 39A of the first additional biasing member 39 is provided about the third shaft 41C. The third shaft 41C rotatably supports the first additional biasing member 39 about the first additional pivot axis PA12.

Figure 10:
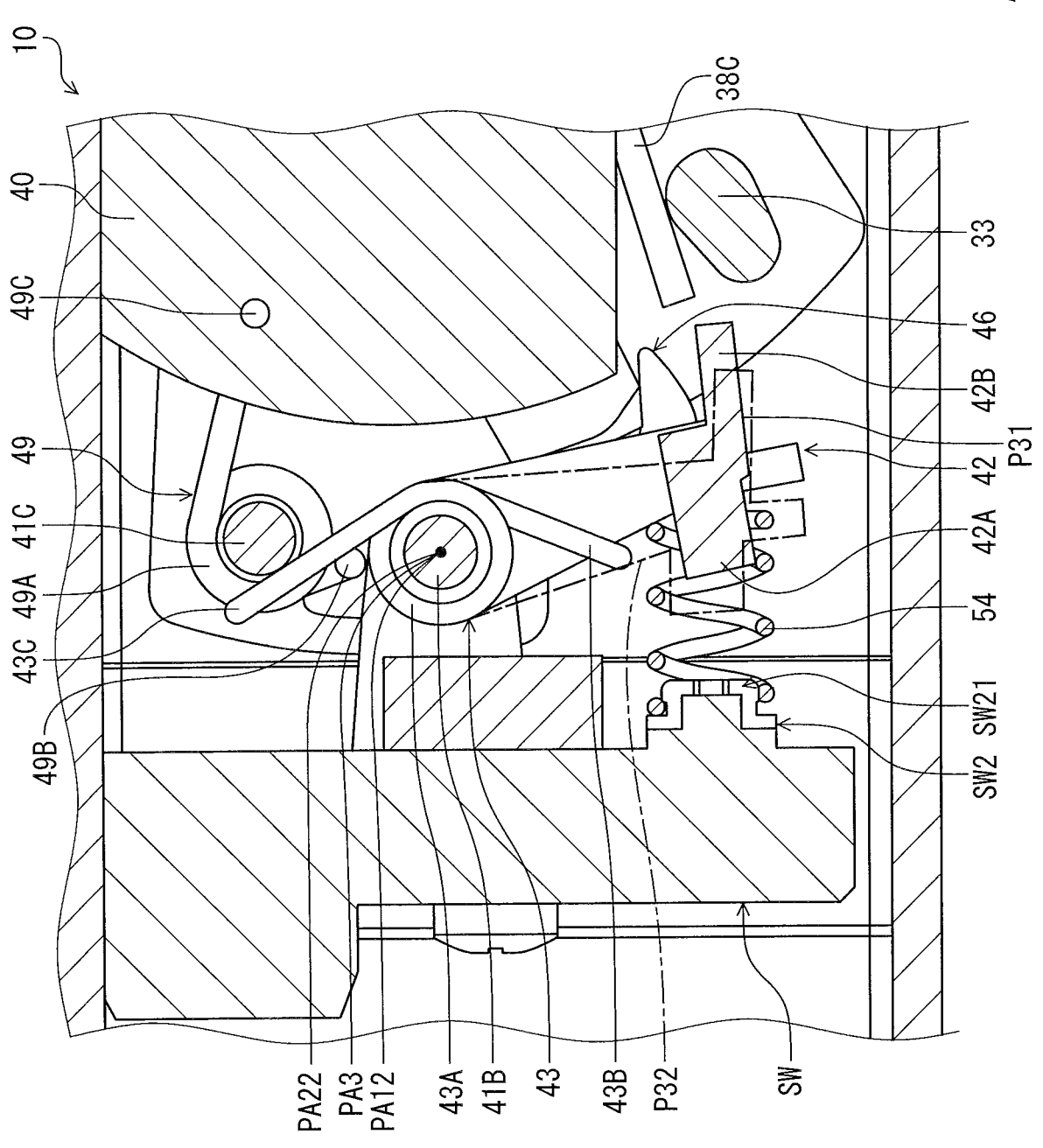
FIG. 10 is a cross-sectional view of the operating device taken along line X-X of FIG. 8.

As seen in FIG. 10, the operating device 10 further comprises an additional activating member 42. The additional activating member 42 is movably arranged with respect to the base 12. The additional activating member 42 is movably arranged with respect to the base 12 from a third rest position P31 to a third operating position P32. The additional activating member 42 activates the third electric switch SW3 in the third operating position P32.

The additional activating member 42 is pivotally coupled to the base 12 about a third pivot axis PA3. The additional activating member 42 is pivotable relative to the base 12 about the third pivot axis PA3 between the third rest position P31 and the third operating position P32.

The operating device 10 includes a third biasing member 43. The third biasing member 43 is configured to bias the additional activating member 42 toward the third rest position P31. The third biasing member 43 is configured to bias the additional activating member 42 toward the third rest position P31.

The third biasing member 43 includes a third coiled portion 43A, a third end portion 43B, and a third additional end portion 43C. The third coiled portion 43A is provided about the second shaft 41B. The second shaft 41B rotatably supports the third biasing member 43 about the third pivot axis PA3. The third end portion 43B is engaged with the additional activating member 42. The third additional end portion 43C is engaged with the third shaft 41C.

As seen in FIG. 6, the additional activating member 42 remains in the third rest position P31 as the first operating member 34 moves from the first rest position P10 to the first intermediate position P11. Thus, the first operating member 34 is movably arranged with respect to the base 12 not to activate the third electric switch SW3 as the first operating member 34 moves from the first rest position P10 to the first intermediate position P11. Namely, the first operating structure 30 is movably arranged with respect to the base 12 not to activate the third electric switch SW3 as the first operating structure 30 moves from the first rest position P10 to the first intermediate position P11 (see e.g., FIG. 18).

Figure 7:
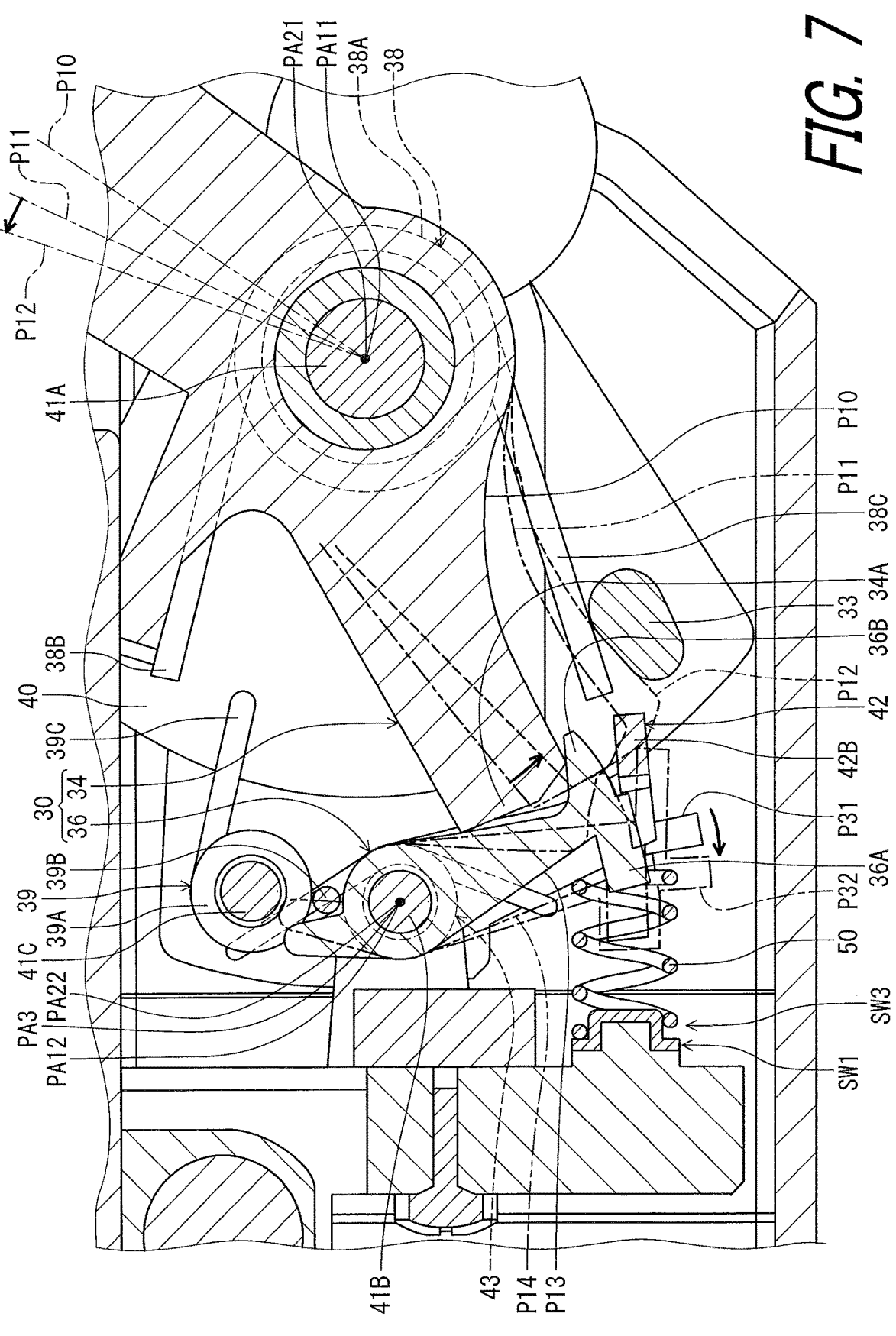
FIG. 7 is a cross-sectional view of the operating device taken along line VII-VII of FIG. 8.

As seen in FIG. 7, the additional activating member 42 is movable with respect to the base 12 in response to a movement of the first operating member 34. The additional activating member 42 is movable relative to the base 12 from the third rest position P31 to the third operating position P32 as the first operating member 34 moves from the first intermediate position P11 to the first operating position P12.

The first operating member 34 moves the additional activating member 42 from the third rest position P31 to the third operating position P32 as the first operating member 34 moves from the first intermediate position P11 to the first operating position P12. Thus, the first operating member 34 is movably arranged with respect to the base 12 to activate the third electric switch SW3 via the additional activating member 42 as the first operating member 34 moves from the first intermediate position P11 to the first operating position P12. Namely, the first operating structure 30 is movably arranged with respect to the base 12 to activate the third electric switch SW3 via the additional activating member 42 as the first operating structure 30 moves from the first intermediate position P11 to the first operating position P12.

The first operating member 34 maintains the first activating member 36 in the first activation position P14 while the first operating member 34 moves from the first intermediate position P11 to the first operating position P12. Thus, the first operating member 34 is movably arranged with respect to the base 12 to activate the third electric switch SW3 as the first operating member 34 moves from the first intermediate position P11 to the first operating position P12 while the first electric switch SW1 remains activated. Namely, the first operating structure 30 is movably arranged with respect to the base 12 to activate the third electric switch SW3 as the first operating structure 30 moves from the first intermediate position P11 to the first operating position P12 of the first operating structure 30 while the first electric switch SW1 remains activated (see e.g., FIG. 18). The first electric switch SW1 and the third electric switch SW3 are activated in a state where the first operating structure 30 is in the first operating position P12.

Figure 11:
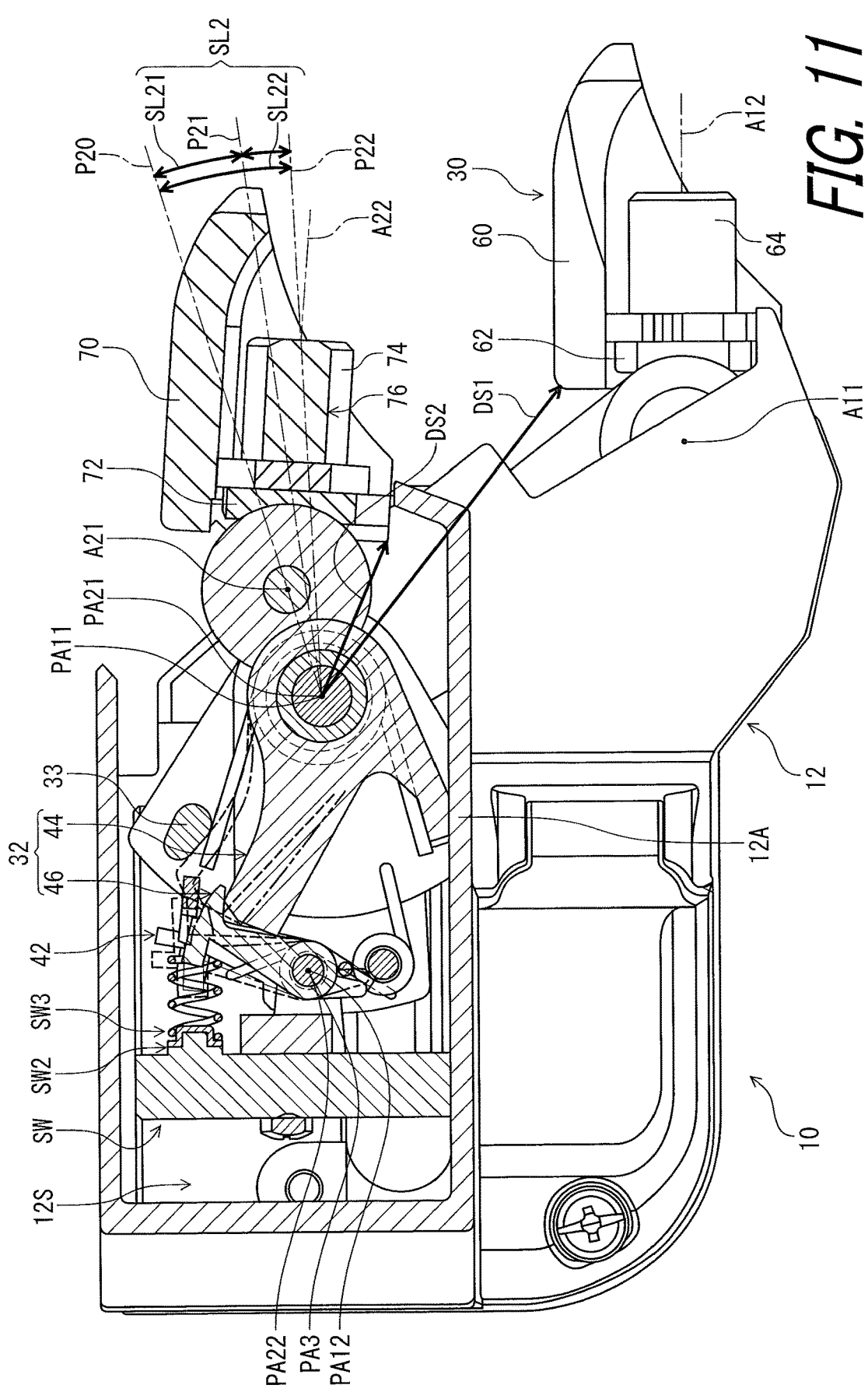
FIG. 11 is a cross-sectional view of the operating device taken along line XI-XI of FIG. 8.

As seen in FIG. 11, the second operating structure 32 is movably arranged with respect to the base 12 from a second rest position P20 to a second operating position P22 through a second intermediate position P21. The second intermediate position P21 is provided between the second rest position P20 and the second operating position P22. The second operating structure 32 is movable relative to the base 12 independently from the first operating structure 30 between the second rest position P20 and the second operating position P22 without moving the first operating structure 30.

The second operating structure 32 is in contact with the stopper 12A in a state where the second operating structure 32 is in the second rest position P20. The second operating structure 32 is in contact with the stopper 33 in a state where the second operating structure 32 is in the second operating position P22.

The second operating structure 32 is movably arranged with respect to the base 12 to activate the second electric switch SW2 as the second operating structure 32 moves from the second rest position P20 to the second intermediate position P21. The second operating structure 32 is movably arranged with respect to the base 12 to activate the third electric switch SW3 as the second operating structure 32 moves from the second intermediate position P21 to the second operating position P22.

The second operating structure 32 includes a second operating member 44 and a second activating member 46. The second operating member 44 is movably arranged with respect to the base 12 from the second rest position P20 to the second operating position P22 through the second intermediate position P21.

Figure 12:
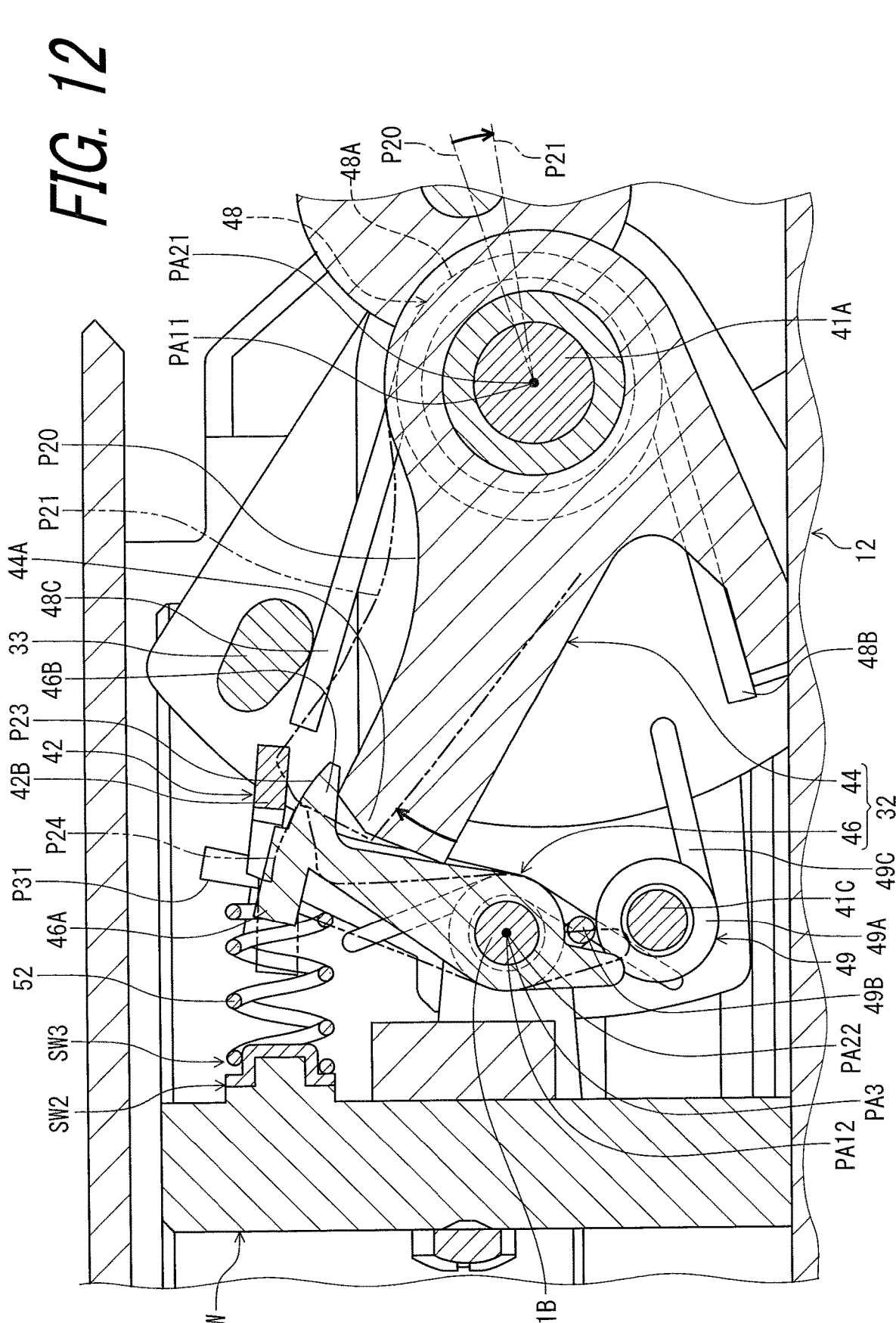
FIG. 12 is a cross-sectional view of the operating device taken along line XII-XII of FIG. 8.

As seen in FIG. 12, the second activating member 46 is movably arranged with respect to the base 12 from a second initial position P23 to a second activation position P24. The second activating member 46 does not activate the second electric switch SW2 in a state where the second activating member 46 is in the second initial position P23. The second activating member 46 activates the second electric switch SW2 in a state where the second activating member 46 is in the second activation position P24.

The operating device 10 includes a second biasing member 48. The second biasing member 48 is configured to bias the second operating structure 32 toward the second rest position P20. The second biasing member 48 is configured to bias the second operating member 44 toward the second rest position P20. The second biasing member 48 includes a second coiled portion 48A, a second end portion 48B, and a second additional end portion 48C. The second operating structure 32 includes a second pivot axis PA21. The second coiled portion 48A is provided about the second pivot axis PA21. The second shaft 41B rotatably supports the second biasing member 48 about the second pivot axis PA21. The second end portion 48B is engaged with the second operating structure 32. The second additional end portion 48C is engaged with the stopper 33.

The operating device 10 includes a second additional biasing member 49. The second additional biasing member 49 is configured to bias the second activating member 46 toward the second initial position P23. The second additional biasing member 49 includes a second coiled portion 49A, a second end portion 49B, and a second additional end portion 49C. The second coiled portion 49A is provided about the third shaft 41C. The third shaft 41C rotatably supports the second additional biasing member 49. The second end portion 49B is engaged with the second activating member 46. The support plate 40 is secured to the base 12. The second additional end portion 49C is engaged with the support plate 40.

As seen in FIG. 12, the second activating member 46 is movable relative to the base 12 as the second operating member 44 moves from the second rest position P20 to the second intermediate position P21. The second operating member 44 moves the second activating member 46 from the second initial position P23 to the second activation position P24 as the second operating member 44 moves from the second rest position P20 to the second intermediate position P21. The second activating member 46 activates the second electric switch SW2 as the second operating member 44 moves the second activating member 46 from the second initial position P23 to the second activation position P24. Thus, the second operating member 44 is movably arranged with respect to the base 12 to activate the second electric switch SW2 via the second activating member 46 as the second operating member 44 moves from the second rest position P20 to the second intermediate position P21. Namely, the second operating structure 32 is movably arranged with respect to the base 12 to activate the second electric switch SW2 as the second operating structure 32 moves from the second rest position P20 to the second intermediate position P21 (see e.g., FIG. 18).

As seen in FIG. 12, the second operating member 44 is pivotally coupled to the base 12 about a second pivot axis PA21. The second activating member 46 is pivotally coupled to the base 12 about a second additional pivot axis PA22. The second operating member 44 is pivotable relative to the base 12 about the second pivot axis PA21 between the second rest position P20 and the second operating position P22. The second activating member 46 is pivotable relative to the base 12 about the second additional pivot axis PA22 between the second initial position P23 and the second activation position P24.

As seen in FIG. 8, the second additional pivot axis PA22 is offset from the second pivot axis PA21. The second additional pivot axis PA22 is parallel to the second pivot axis PA21. The first pivot axis PA11 is coincident with the second pivot axis PA21. The first additional pivot axis PA12 is coincident with the second additional pivot axis PA22. However, the positional relationship between the second pivot axis PA21 and the second additional pivot axis PA22 is not limited to the illustrated embodiment. The positional relationship between the first pivot axis PA11 and the second pivot axis PA21 is not limited to the illustrated embodiment. The positional relationship between the first additional pivot axis PA12 and the second additional pivot axis PA22 is not limited to the illustrated embodiment. The second additional pivot axis PA22 can be coincident with the second pivot axis PA21 if needed or desired. The second additional pivot axis PA22 can be non-parallel to the second pivot axis PA21 if needed or desired. The first pivot axis PA11 can be offset from the second pivot axis PA21 if needed or desired. The first additional pivot axis PA12 can be offset from the second additional pivot axis PA22 if needed or desired.

The first shaft 41A rotatably supports the second operating member 44 about the second pivot axis PA21. The second shaft 41B rotatably supports the second activating member 46 about the second additional pivot axis PA22. The first shaft 41A extends along the second pivot axis PA21. The second shaft 41B extends along the second additional pivot axis PA22. The second coiled portion 48A of the second biasing member 48 is provided about the first shaft 41A. The first shaft 41A rotatably supports the second biasing member 48 about the second pivot axis PA21.

As seen in FIG. 9, the second coiled portion 49A of the second additional biasing member 49 is provided about the third shaft 41C. The third shaft 41C rotatably supports the second additional biasing member 49 about the second additional pivot axis PA22.

As seen in FIG. 12, the additional activating member 42 remains in the third rest position P31 as the second operating member 44 moves from the second rest position P20 to the second intermediate position P21. Thus, the second operating member 44 is movably arranged with respect to the base 12 not to activate the third electric switch SW3 as the second operating member 44 moves from the second rest position P20 to the second intermediate position P21. Namely, the second operating structure 32 is movably arranged with respect to the base 12 not to activate the third electric switch SW3 as the second operating structure 32 moves from the second rest position P20 to the second intermediate position P21 (see e.g., FIG. 18).

Figure 13:
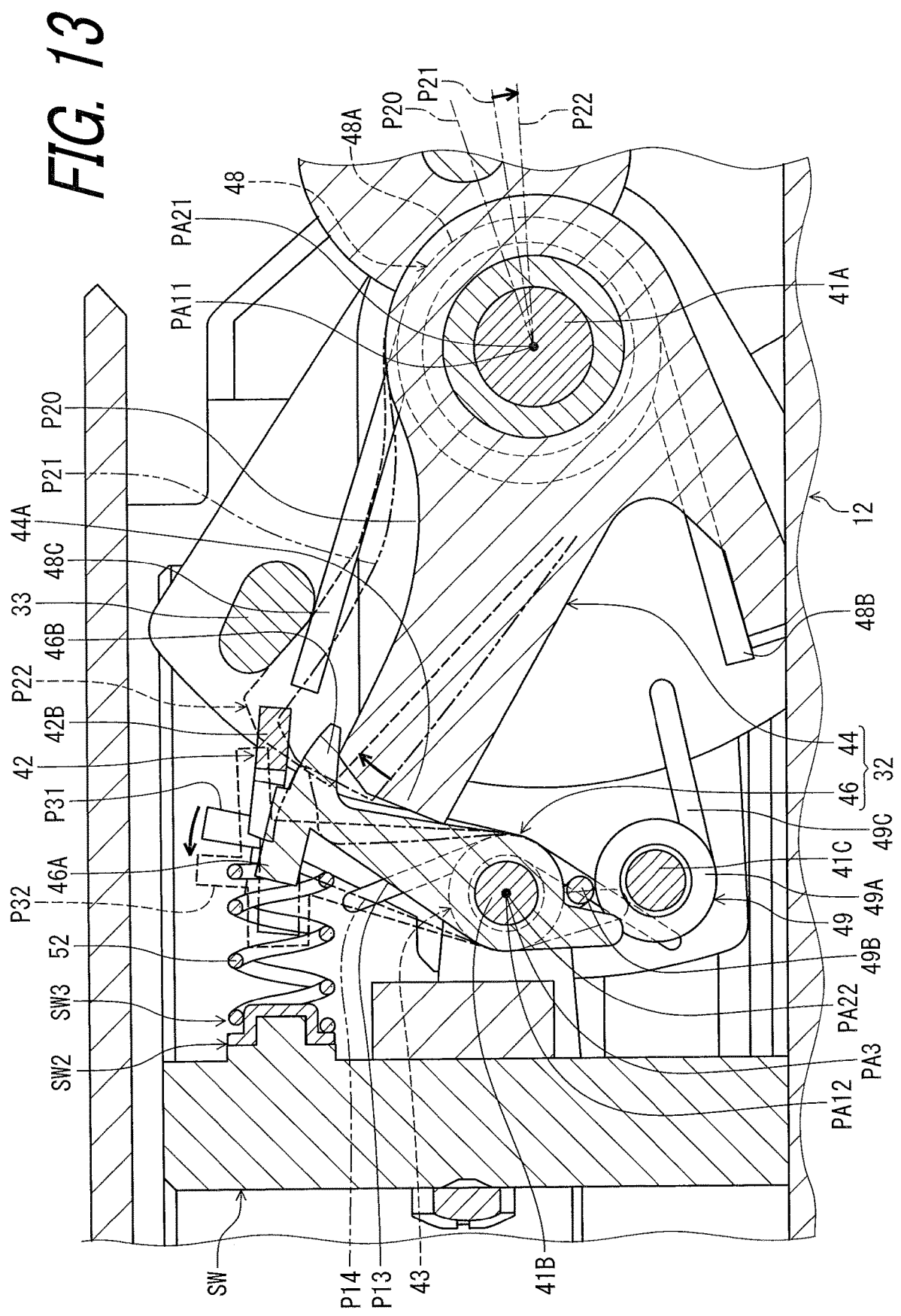
FIG. 13 is a cross-sectional view of the operating device taken along line XIII-XIII of FIG. 8.

As seen in FIG. 13, the additional activating member 42 is movable with respect to the base 12 in response to a movement of the second operating member 44. The additional activating member 42 is movable relative to the base 12 from the third rest position P31 to the third operating position P32 as the second operating member 44 moves from the second intermediate position P21 to the second operating position P22.

The second operating member 44 moves the additional activating member 42 from the third rest position P31 to the third operating position P32 as the second operating member 44 moves from the second intermediate position P21 to the second operating position P22. Thus, the second operating member 44 is movably arranged with respect to the base 12 to activate the third electric switch SW3 via the additional activating member 42 as the second operating member 44 moves from the second intermediate position P21 to the second operating position P22. Namely, the second operating structure 32 is movably arranged with respect to the base 12 to activate the third electric switch SW3 via the additional activating member 42 as the second operating structure 32 moves from the second intermediate position P21 to the second operating position P22.

The second operating member 44 maintains the second activating member 46 in the second activation position P24 while the second operating member 44 moves from the second intermediate position P21 to the second operating position P22. Thus, the second operating member 44 is movably arranged with respect to the base 12 to activate the third electric switch SW3 as the second operating member 44 moves from the second intermediate position P21 to the second operating position P22 while the second electric switch SW2 remains activated. Namely, the second operating member 44 is movably arranged with respect to the base 12 to activate the third electric switch SW3 as the second operating structure 32 moves from the second intermediate position P21 to the second operating position P22 of the second operating structure 32 while the second electric switch SW2 remains activated (see e.g., FIG. 18). The second electric switch SW2 and the third electric switch SW3 are activated in a state where the second operating member 44 is in the second operating position P22.

As seen in FIG. 13, the third pivot axis PA3 is coincident with at least one of the first additional pivot axis PA12 and the second additional pivot axis PA22. In the present embodiment, the third pivot axis PA3 is coincident with the first additional pivot axis PA12. The third pivot axis PA3 is coincident with the second additional pivot axis PA22. However, the third pivot axis PA3 can be offset from at least one of the first additional pivot axis PA12 and the second additional pivot axis PA22 if needed or desired.

As seen in FIG. 4, the first operating structure 30 includes a first activation portion 36A. The first activating member 36 includes the first activation portion 36A. The first activation portion 36A is movable toward the first electric switch SW1 as the first operating structure 30 moves from the first rest position P10 to the first intermediate position P11. The first electric switch SW1 includes a first button SW11.

The second operating structure 32 includes a second activation portion 46A. The second activating member 46 includes the second activation portion 46A. The second activation portion 46A is movable toward the second electric switch SW2 as the second operating structure 32 moves from the second rest position P20 to the second intermediate position P21. The second electric switch SW2 includes a second button SW21.

The additional activating member 42 includes an additional activation portion 42A. The additional activation portion 42A is movable toward the third electric switch SW3 as the first operating structure 30 moves from the first intermediate position P11 to the first operating position P12. The additional activation portion 42A is movable toward the third electric switch SW3 as the second operating structure 32 moves from the second intermediate position P21 to the second operating position P22. The third electric switch SW3 includes a third button SW31.

The operating device 10 includes a first switch biasing member 50, a second switch biasing member 52, and a third switch biasing member 54. The first switch biasing member 50 is provided between the first activating member 36 and the first electric switch SW1 to bias the first activating member 36 away from the first electric switch SW1. The second switch biasing member 52 is provided between the second activating member 46 and the second electric switch SW2 to bias the second activating member 46 away from the second electric switch SW2. The third switch biasing member 54 is provided between the additional activating member 42 and the third electric switch SW3 to bias the additional activating member 42 away from the third electric switch SW3.

The first activation portion 36A is at least partially provided in the first switch biasing member 50. The first button SW11 is at least partially provided in the first switch biasing member 50. The second activation portion 46A is at least partially provided in the second switch biasing member 52. The second button SW21 is at least partially provided in the second switch biasing member 52. The additional activation portion 42A is at least partially provided in the third switch biasing member 54. The third button SW31 is at least partially provided in the third switch biasing member 54.

Figure 14:
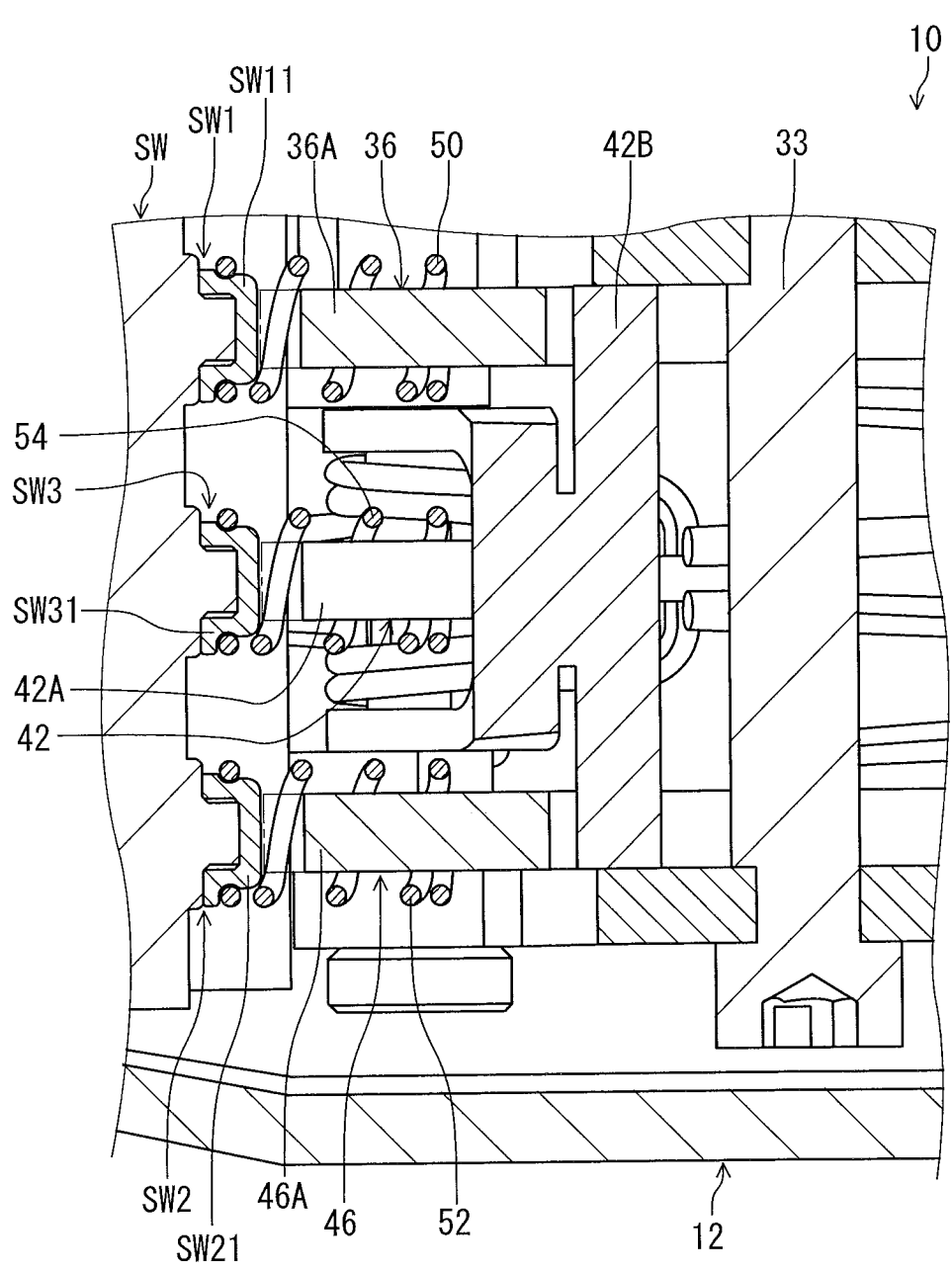
FIG. 14 is a cross-sectional view of the operating device taken along line XIV-XIV of FIG. 5.

As seen in FIG. 7, the first activation portion 36A is configured to press the first button SW11 via the first switch biasing member 50 as the first activating member 36 moves from the first initial position P13 toward the first activation position P14. The first activation portion 36A does not contact the first button SW11 as the first operating structure 30 moves from the first rest position P10 to the first operating position P12. The first switch biasing member 50 has rigidity sufficient to activate the first electric switch SW1 in response to the movement of the first activating member 36. As seen in FIG. 14, however, the first activation portion 36A can be configured to contact the first button SW11 as the first operating structure 30 moves from the first rest position P10 to the first operating position P12 if needed or desired. In such modifications, the first switch biasing member 50 has rigidity allowing the first activation portion 36A to contact the first button SW11.

As seen in FIG. 13, the second activation portion 46A is configured to press the second button SW21 via the second switch biasing member 52 as the second activating member 46 moves from the second initial position P23 toward the second activation position P24. The second activation portion 46A does not contact the second button SW21 as the second operating structure 32 moves from the second rest position P20 to the second operating position P22. The second switch biasing member 52 has rigidity sufficient to activate the second electric switch SW2 in response to the movement of the second activating member 46. As seen in FIG. 14, however, the second activation portion 46A can be configured to contact the second button SW21 as the second operating structure 32 moves from the second rest position P20 to the second operating position P22 if needed or desired. In such modifications, the second switch biasing member 52 has rigidity allowing the second activation portion 46A to contact the second button SW21.

As seen in FIG. 10, the additional activation portion 42A is configured to press the third button SW31 via the third switch biasing member 54 as the additional activating member 42 moves from the third rest position P31 toward the third operating position P32. The additional activation portion 42A does not contact the third button SW31 as the additional activating member 42 moves from the third rest position P31 to the third operating position P32. The third switch biasing member 54 has rigidity sufficient to activate the third electric switch SW3 in response to the movement of the additional activating member 42. As seen in FIG. 14, however, the additional activation portion 42A can be configured to contact the third button SW31 as the additional activating member 42 moves from the third rest position P31 to the third operating position P32 if needed or desired. In such modifications, the third switch biasing member 54 has rigidity allowing the additional activation portion 42A to contact the third button SW31.

As seen in FIG. 4, the first operating structure 30 is at least partially spaced apart from the second operating structure 32 in an arrangement direction D1. The additional activating member 42 is at least partially provided between the first operating structure 30 and the second operating structure 32 in the arrangement direction D1. In the present embodiment, the first operating structure 30 is entirely spaced apart from the second operating structure 32 in the arrangement direction D1. The additional activating member 42 is partially provided between the first operating structure 30 and the second operating structure 32 in the arrangement direction D1. However, the first operating structure 30 can be partially spaced apart from the second operating structure 32 in the arrangement direction D1 if needed or desired. The additional activating member 42 can be entirely provided between the first operating structure 30 and the second operating structure 32 in the arrangement direction D1 if needed or desired.

The first electric switch SW1, the second electric switch SW2, and the third electric switch SW3 are arranged in the arrangement direction D1. The third electric switch SW3 is at least partially provided between the first electric switch SW1 and the second electric switch SW2 in the arrangement direction D1. In the present embodiment, the third electric switch SW3 is entirely provided between the first electric switch SW1 and the second electric switch SW2 in the arrangement direction D1. However, the third electric switch SW3 can be partially provided between the first electric switch SW1 and the second electric switch SW2 in the arrangement direction D1 if needed or desired.

In the present embodiment, at least one of the first pivot axis PA11, the first additional pivot axis PA12, the second pivot axis PA21, the second additional pivot axis PA22, and the third pivot axis PA3 extends along the arrangement direction D1. At least one of the first pivot axis PA11, the first additional pivot axis PA12, the second pivot axis PA21, the second additional pivot axis PA22, and the third pivot axis PA3 is parallel to the arrangement direction D1. Each of the first pivot axis PA11, the first additional pivot axis PA12, the second pivot axis PA21, the second additional pivot axis PA22, and the third pivot axis PA3 extends along the arrangement direction D1. Each of the first pivot axis PA11, the first additional pivot axis PA12, the second pivot axis PA21, the second additional pivot axis PA22, and the third pivot axis PA3 is parallel to the arrangement direction D1. However, at least one of the first pivot axis PA11, the first additional pivot axis PA12, the second pivot axis PA21, the second additional pivot axis PA22, and the third pivot axis PA3 can be non-parallel to the arrangement direction D1 if needed or desired.

Figure 15:
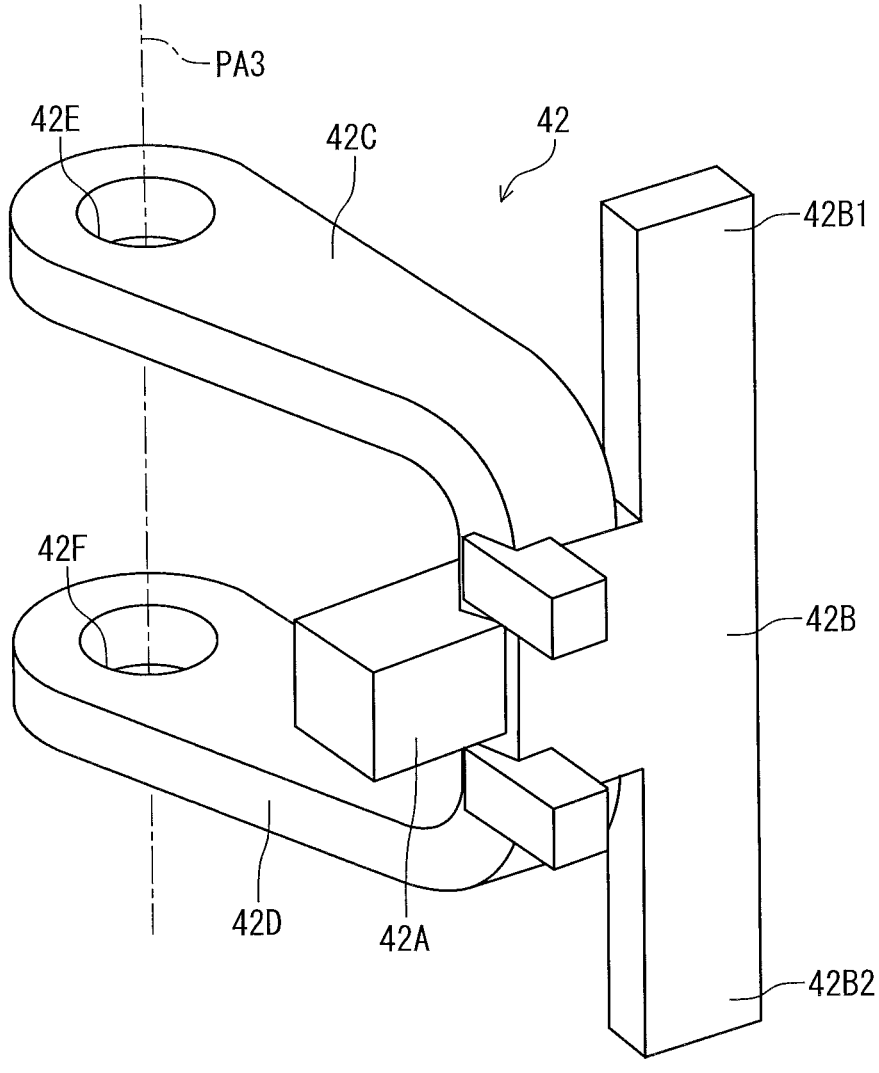
FIG. 15 is a perspective view of an additional activating member of the operating device illustrated in FIG. 1.

As seen in FIG. 15, the additional activating member 42 includes an additional contacting part 42B, a first arm 42C, and a second arm 42D. The additional contacting part 42B extends along the third pivot axis PA3. The additional contacting part 42B includes a first end 42B1 and a second end 42B2. The additional contacting part 42B extends between the first end 42B1 and the second end 42B2. The additional activation portion 42A protrudes from the additional contacting part 42B. The first arm 42C extends from the additional contacting part 42B. The second arm 42D extends from the additional contacting part 42B. The first arm 42C includes a first hole 42E. The second arm 42D includes a second hole 42F. As seen in FIG. 8 the second shaft 41B extends through the first hole 42E and the second hole 42F.

As seen in FIG. 7, the additional contacting part 42B is contactable with the first operating structure 30. The additional contacting part 42B is contactable with the first operating member 34. As seen in FIG. 13, the additional contacting part 42B is contactable with the second operating structure 32. The additional contacting part 42B is contactable with the second operating member 44.

As seen in FIG. 6, the first activating member 36 includes a first contacting part 36B. The first operating member 34 includes a second contacting part 34A. The additional activating member 42 includes the additional contacting part 42B. The first contacting part 36B is contactable with the second contacting part 34A in response to the movement of the first operating member 34. The first contacting part 36B is contactable with the second contacting part 34A in response to a first movement of the first operating member 34 from the first rest position P10 to the first intermediate position P11.

As seen in FIG. 7, the additional contacting part 42B is contactable with the second contacting part 34A in response to the movement of the first operating member 34. The additional contacting part 42B is contactable with the second contacting part 34A in response to a first additional movement of the first operating member 34 from the first intermediate position P11 to the first operating position P12. The first contacting part 36B is contactable with the second contacting part 34A in response to the first additional movement of the first operating member 34.

As seen in FIG. 12, the second activating member 46 includes a third contacting part 46B. The second operating member 44 includes a fourth contacting part 44A. The third contacting part 46B is contactable with the fourth contacting part 44A in response to the movement of the second operating member 44. The third contacting part 46B is contactable with the fourth contacting part 44A in response to a second movement of the second operating member 44 from the second rest position P20 to the second intermediate position P21.

As seen in FIG. 13, the additional contacting part 42B is contactable with the fourth contacting part 44A in response to the movement of the second operating member 44. The additional contacting part 42B is contactable with the fourth contacting part 44A in response to a second additional movement of the second operating member 44 from the second intermediate position P21 to the second operating position P22. The third contacting part 46B is contactable with the fourth contacting part 44A in response to the second additional movement of the second operating member 44.

Figure 16:
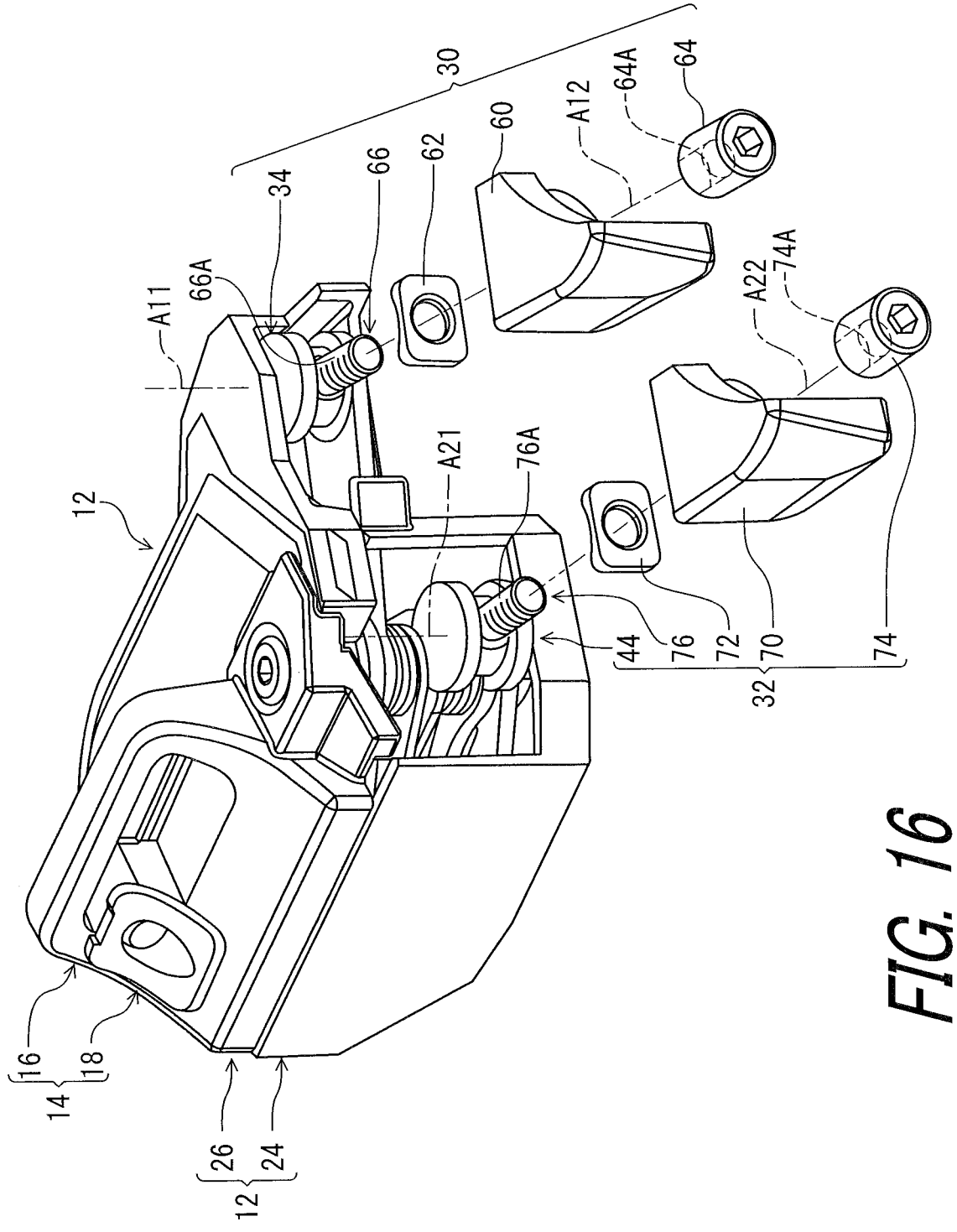
FIG. 16 is an exploded perspective view of the operating device illustrated in FIG. 1.

As seen in FIG. 16, the first operating structure 30 includes a first user input member 60, a first washer 62, a first fastener 64, and a first movable member 66. The first movable member 66 is pivotally coupled to the first operating member 34 about a first adjustment axis A11. The first user input member 60 is pivotally coupled to the first movable member 66 about a first additional adjustment axis A12. The first user input member 60 is coupled to the first movable member 66 with the first fastener 64. The first movable member 66 includes a first threaded part 66A. The first fastener 64 includes a first threaded hole 64A configured to be engaged with the first threaded part 66A of the first movable member 66. The first washer 62 is provided between the first user input member 60 and the first operating member 34. The first user input member 60 is pivotable relative to the first operating member 34 about the first adjustment axis A11 and the first additional adjustment axis A12 in a state where the first fastener 64 is loosened. The first user input member 60 is positioned relative to the first operating member 34 in a state where the first fastener 64 is loosened. Thus, it is possible to adjust the position of the first user input member 60 relative to the first operating member 34 about the first adjustment axis A11 and the first additional adjustment axis A12. However, the first user input member 60 can be coupled to the first operating member 34 without an adjustment structure such as the first washer 62, the first fastener 64, and the first movable member 66 if needed or desired.

The second operating structure 32 includes a second user input member 70, a second washer 72, a second fastener 74, and a second movable member 76. The second movable member 76 is pivotally coupled to the second operating member 44 about a second adjustment axis A21. The second user input member 70 is pivotally coupled to the second movable member 76 about a second additional adjustment axis A22. The second user input member 70 is coupled to the second movable member 76 with the second fastener 74. The second movable member 76 includes a second threaded part 76A. The second fastener 74 includes a second threaded hole 74A configured to be engaged with the second threaded part 76A of the second movable member 76. The second washer 72 is provided between the second user input member 70 and the second operating member 44. The second user input member 70 is pivotable relative to the second operating member 44 about the second adjustment axis A21 and the second additional adjustment axis A22 in a state where the second fastener 74 is loosened. The second user input member 70 is positioned relative to the second operating member 44 in a state where the second fastener 74 is loosened. Thus, it is possible to adjust the position of the second user input member 70 relative to the second operating member 44 about the second adjustment axis A21 and the second additional adjustment axis A22. However, the second user input member 70 can be coupled to the second operating member 44 without an adjustment structure such as the second washer 72, the second fastener 74, and the second movable member 76 if needed or desired.

As seen in FIG. 11, a first distance DS1 is defined between the first user input member 60 and the first pivot axis PA11 as viewed along the first pivot axis PA11. A second distance DS2 is defined between the second user input member 70 and the second pivot axis PA21 as viewed along the second pivot axis PA21. The first distance DS1 is different from the second distance DS2. In the present embodiment, the first distance DS1 is longer than the second distance DS2. However, the first distance DS1 can be shorter than or equal to the second distance DS2 if needed or desired.

The first distance DS1 is defined, as a minimum distance, between the first user input member 60 and the first pivot axis PA11 as viewed along the first pivot axis PA11. The second distance DS2 is defined, as a minimum distance, between the second user input member 70 and the second pivot axis PA21 as viewed along the second pivot axis PA21. The first distance DS1 varies when the first user input member 60 pivots relative to the first operating member 34 about at least one of the first adjustment axis A11 and the first additional adjustment axis A12. The second distance DS2 varies when the second user input member 70 pivots relative to the second operating member 44 about at least one of the second adjustment axis A21 and the second additional adjustment axis A22.

The first operating structure 30 is moved relative to the base 12 in response to a first force applied to the first user input member 60. The second operating structure 32 is moved relative to the base 12 in response to a second force applied to the second user input member 70. The first force is different from the second force since the first distance DS1 is different from the second distance DS2. In the present embodiment, the first force is less than the second force since the first distance DS1 is longer than the second distance DS2. However, the first force can be greater than or equal to the second force if needed or desired.

Figure 17:
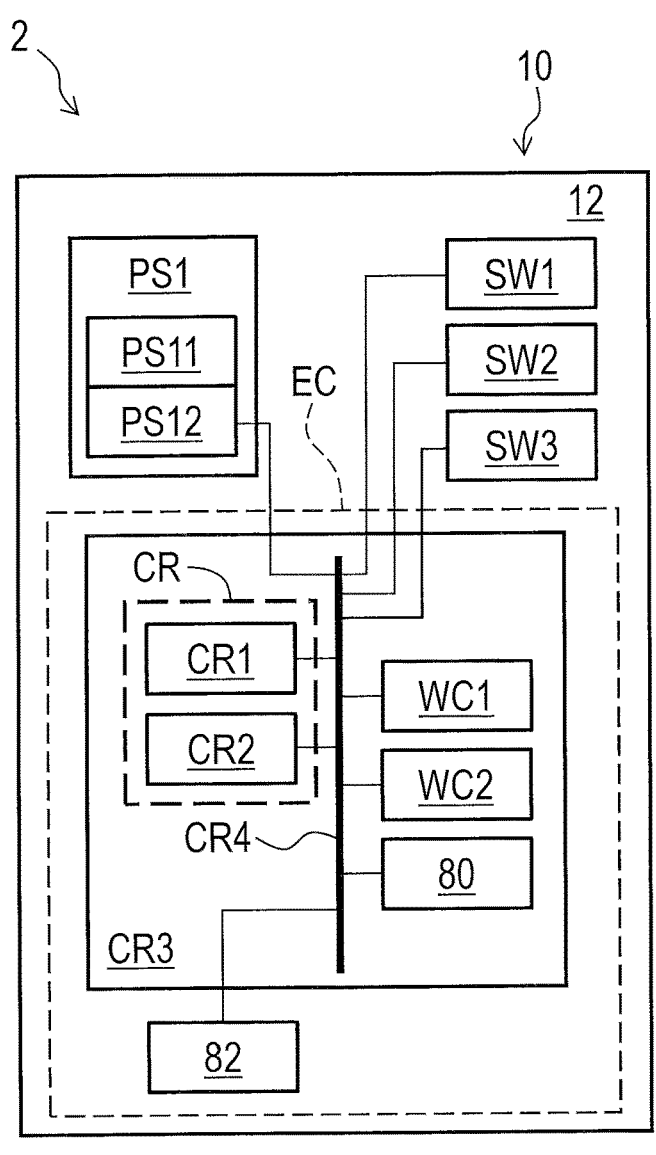
FIG. 17 is a schematic block diagram of the human-powered vehicle including the operating device illustrated in FIG. 1.
Figure 17:
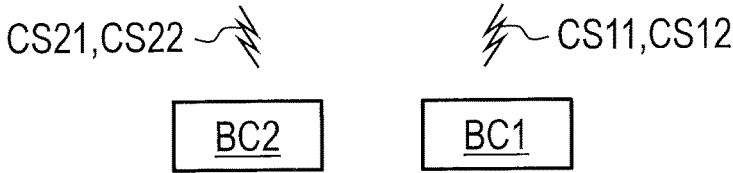

As seen in FIG. 17, the operating device 10 includes electronic circuitry EC. The electronic circuitry EC includes an electronic controller CR, a circuit board CR3, a system bus CR4, a wireless communicator WC1, and a wired communicator WC2, an informing unit 80, and a connection port 82. The electronic circuitry EC is configured to be electrically connected to the first electric switch SW1, the second electric switch SW2, and the third electric switch SW3. The electronic controller CR is configured to be electrically connected to the first electric switch SW1, the second electric switch SW2, the third electric switch SW3, the wireless communicator WC1, the wired communicator WC2, the informing unit 80, and the connection port 82.

The electronic controller CR includes a hardware processor CR1 and a hardware memory CR2. The hardware processor CR1 is coupled to the hardware memory CR2. The hardware memory CR2 is coupled to the hardware processor CR1. The hardware processor CR1 and the hardware memory CR2 are electrically mounted on the circuit board CR3. The hardware processor CR1 is electrically connected to the hardware memory CR2 via the circuit board CR3 and the system bus CR4. The hardware memory CR2 is electrically connected to the hardware processor CR1 via the circuit board CR3 and the system bus CR4. For example, the electronic controller CR includes a semiconductor. The hardware processor CR1 includes a semiconductor. The hardware memory CR2 includes a semiconductor. However, the electronic controller CR can be free of a semiconductor if needed or desired. The hardware processor CR1 can be free of a semiconductor if needed or desired. The hardware memory CR2 can be free of a semiconductor if needed or desired.

For example, the hardware processor CR1 includes at least one of a central processing unit (CPU), a micro processing unit (MPU), and a memory controller. The hardware memory CR2 is electrically connected to the hardware processor CR1. For example, the hardware memory CR2 includes at least one of a volatile memory and a non-volatile memory. Examples of the volatile memory include a random-access memory (RAM) and a dynamic random-access memory (DRAM). Examples of the non-volatile memory include a read only memory (ROM), an electrically erasable programmable ROM (EEPROM), and a magnetic disc. The hardware memory CR2 includes storage areas each having an address. The hardware processor CR1 is configured to control the hardware memory CR2 to store data in the storage areas of the hardware memory CR2 and reads data from the storage areas of the hardware memory CR2. The hardware memory CR2 can also be referred to as a computer-readable storage medium CR2.

The electronic controller CR is configured to execute at least one control algorithm of the operating device 10. For example, the electronic controller CR is programed to execute at least one control algorithm of the operating device 10. The hardware memory CR2 stores at least one program including at least one program instruction. The at least one program is read into the hardware processor CR1, and thereby the at least one control algorithm of the operating device 10 is executed based on the at least one program. The electronic controller CR can also be referred to as an electronic controller circuit or circuitry CR. The electronic controller CR can also be referred to as an electronic hardware controller circuit or circuitry CR.

The structure of the electronic circuitry EC is not limited to the above structure. The structure of the electronic controller CR is not limited to the above structure. The structure of the electronic controller CR is not limited to the hardware processor CR1 and the hardware memory CR2. The electronic circuitry EC can be realized by hardware alone or a combination of hardware and software. In the present embodiment, the hardware processor CR1 and the hardware memory CR2 are integrated as a single chip such as an application specific integrated circuit (ASIC) or a field programmable gate array (FPGA). However, the hardware processor CR1 and the hardware memory CR2 can be separate chips if needed or desired. The electronic controller CR can include the hardware processor CR1, the hardware memory CR2, the circuit board CR3, and the system bus CR4 if needed or desired. The electronic controller CR can be at least two electronic controllers which are separately provided. The electronic circuitry EC can include at least two electronic controllers which are separately provided. The at least one control algorithm of the operating device 10 can be executed by the at least two electronic controllers if needed or desired. The electronic controller CR can include at least two hardware processors which are separately provided. The electronic controller CR can include at least two hardware memories which are separately provided. The at least one control algorithm of the operating device 10 can be executed by the at least two hardware processors if needed or desired. The at least one control algorithm of the operating device 10 can be stored in the at least two hardware memories if needed or desired. The electronic circuitry EC can include at least two circuit boards which are separately provided if needed or desired. The electronic circuitry EC can include at least two system buses which are separately provided if needed or desired.

As seen in FIG. 17, the wireless communicator WC1 is configured to wirelessly communicate with at least one electric device such as the electric device BC1 or BC2. The wireless communicator WC1 is electrically connected to the hardware processor CR1 and the hardware memory CR2 with the circuit board CR3 and the system bus CR4. The wireless communicator WC1 is electrically mounted on the circuit board CR3. The wireless communicator WC1 includes a signal transmitting circuit or circuitry, a signal receiving circuit or circuitry, and an antenna. Thus, the wireless communicator WC1 can also be referred to as a wireless communicator circuit or circuitry WC1.

The wireless communicator WC1 is configured to superimpose digital signals on carrier wave using a predetermined wireless communication protocol to wirelessly transmit signals. For example, the wireless communicator WC1 is configured to encrypt signals using a cryptographic key to generate encrypted wireless signals. The wireless communicator WC1 is configured to transmit wireless signals via the antenna. The wireless communicator WC1 can be a one-way wireless communication device such as a receiver, or a two-way wireless communication device such as a transceiver.

For example, the wireless communicator WC1 is configured to receive wireless signals via the antenna. In the present embodiment, the wireless communicator WC1 is configured to decode the wireless signals to recognize signals transmitted from other wireless communicators. The wireless communicator WC1 is configured to decrypt the wireless signals using the cryptographic key.

The term "wireless communicator" as used herein includes a receiver, a transmitter, a transceiver, a transmitter-receiver, and contemplates any device or devices, separate or combined, capable of transmitting and/or receiving wireless communication signals, including shift signals or control, command or other signals related to some function of the component being controlled. Here, the wireless communicator WC11 is configured to at least receive a wireless signal. For example, the wireless communicator WC11 is a two-way wireless transceiver that conducts two-way wireless communications using the wireless receiver for wirelessly receiving shift signals and a wireless transmitter for wirelessly transmitting data. In the present embodiment, the wireless communicator WC11 can wirelessly communicate with other ones of the bicycle components BC. The wireless control signals of the wireless communicator WC11 can be radio frequency (RF) signals, ultra-wide band communication signals, radio frequency identification (RFID), Wi-Fi (registered trademark), Zigbee (registered trademark), ANT+ (registered trademark) communications, or Bluetooth (registered trademark) communications or any other type of signal suitable for short range wireless communications as understood in the bicycle field. It should also be understood that the wireless communicator WC11 can transmit the signals at a particular frequency and/or with an identifier such as a particular code, to distinguish the wireless control signal from other wireless control signals. In this way, the operating device 10 can recognize which control signals are to be acted upon and which control signals are not to be acted upon. Thus, the operating device 10 can ignore the control signals from other wireless communicators of other electric devices.

As seen in FIG. 17, the wired communicator WC2 is configured to communicate with at least one additional electric device via an electric cable. The wired communicator WC2 is electrically connected to the hardware processor CR1 and the hardware memory CR2 with the circuit board CR3 and the system bus CR4. The wired communicator WC2 is electrically mounted on the circuit board CR3. The wired communicator WC2 includes a signal transmitting circuit or circuitry and a signal receiving circuit or circuitry. Thus, the wired communicator WC2 can also be referred to as a wired communicator circuit or circuitry WC2.

The wired communicator WC2 is configured to communicate with an additional electric device via a wired communication channel. The connection port 82 is electrically connected to the wired communicator WC2. The wired communicator WC2 is electrically connected to the electronic controller CR. The wired communicator WC2 is configured to communicate with an electric device via the electric cable detachably connected to the connection port 82. However, the wired communicator WC2 can be omitted from the electronic circuitry EC if needed or desired.

For example, the wired communicator WC2 is configured to communicate with an additional wired communicator of an electric device via an electric cable using power line communication (PLC) technology. More specifically, the electric cable includes a ground line and a voltage line that are detachably connected to a serial bus that is formed by communication interfaces. In the present embodiment, the wired communicator WC2 is configured to communicate with the additional electric component through the voltage line using the PLC technology. However, the wired communicator WC2 can be configured to communicate with the additional electric component using wired communication technologies other than the PLC technology. Since the PLC technology has been known, it will not be described in detail here for the sake of brevity. The electronic controller CR can be configured to update firmware stored in the hardware memory CR2 via the connection port 82 in a case where a device configured to update firmware is electrically connected to the connection port 82.

As seen in FIG. 17, the operating device 10 includes an electric power source PS1. The electric power source PS1 is configured to supply electricity to the electronic controller CR, the wireless communicator WC1, the wired communicator WC2, and the informing unit 80. The electric power source PS1 includes a battery PS11 and a battery holder PS12. The battery holder PS12 is electrically connected to the electronic controller CR, the wireless communicator WC1, the wired communicator WC2, and the informing unit 80. The battery holder PS12 is configured to detachably and reattachably hold the battery PS11. Examples of the battery PS11 include a primary battery and a secondary battery. Examples of the battery PS11 include a coin-cell battery.

As seen in FIG. 5, the battery PS11 includes a first battery PS11A and a second battery PS11B. The battery holder PS12 includes a first battery holder space PS12A and a second battery holder space PS12B. The first battery PS11A is provided in the first battery holder space PS12A. The second battery PS11B is provided in the second battery holder space PS12B. However, the battery PS11 can include at least one batteries if needed or desired. The battery holder PS12 can include at least one battery holder space if needed or desired.

As seen in FIG. 18, the electronic controller CR is configured to control another device in response to the activation of the first electric switch SW1, the activation of the second electric switch SW2, or the activation of the third electric switch SW3. In the present embodiment, the electronic controller CR is configured to generate a control signal CS11 in response to the activation of the first electric switch SW1. The electronic controller CR is configured to generate a control signal CS12 in response to the activation of the first electric switch SW1 and the activation of the third electric switch SW3. The electronic controller CR is configured to generate a control signal CS21 in response to the activation of the second electric switch SW2. The electronic controller CR is configured to generate a control signal CS22 in response to the activation of the second electric switch SW2 and the activation of the third electric switch SW3.

For example, the electronic controller CR is configured to control the wireless communicator WC1 to wirelessly transmit the control signal CS11 or CS12 to the electric device BC1. In a case where the electric device BC1 includes a gear changer, for example, the control signal CS11 indicates one of upshifting and downshifting of the electric device BC1. The control signal CS12 indicates the other of upshifting and downshifting of the electric device BC1. However, the electric device BC1 is not limited to the gear changer. The electric device BC1 can include an adjustable seatpost, a suspension, a gear changer, a brake device, a lighting device, an assist drive unit, a cycle computer, a smartphone, a tablet computer, a personal computer, or other types of device if needed or desired.

For example, the electronic controller CR is configured to control the wireless communicator WC1 to wirelessly transmit the control signal CS21 or CS22 to the electric device BC2. In a case where the electric device BC2 includes an additional gear changer, for example, the control signal CS21 indicates one of upshifting and downshifting of the electric device BC2. The control signal CS22 indicates the other of upshifting and downshifting of the electric device BC2. However, the electric device BC2 is not limited to the additional gear changer. The electric device BC2 can include an adjustable seatpost, a suspension, a gear changer, a brake device, a lighting device, an assist drive unit, a cycle computer, a smartphone, a tablet computer, a personal computer, or other types of device if needed or desired.

As seen in FIG. 17, the informing unit 80 is configured to inform the user of a state of the operating device 10. Examples of the state of the operating device 10 include a communication state of the wireless communicator WC1, a communication state of the wired communicator WC2, a level of remaining electricity of the electric power source PS1, and a pairing state of the wireless communicator WC1. Examples of the informing unit 80 include a light emitter such as a light-emitting diode (LED), a vibration generator, and a loudspeaker. The informing unit 80 is configured to indicate the state of the operating device 10 in a case where the informing unit 80 includes the light emitter.

The informing unit 80 can be configured to inform the user of a state of an assist drive unit configured to assist propulsion of the human-powered vehicle 2. Examples of the state of the assist drive unit include a mode of the assist drive unit and a remaining electricity of an electric power source configured to supply electricity to the assist drive unit. For example, the assist drive unit has at least two modes such as an auto shift mode and a manual shift mode. The informing unit 80 can be configured to inform the user of selected one of the at least two modes of the assist drive unit. The informing unit 80 can be configured to indicate the selected one of the at least two modes of the assist drive unit in a case where the informing unit 80 includes the light emitter. The informing unit 80 can be configured to indicate the at least two modes with at least two different colors. In a case where the informing unit 80 is configured to inform the user of the state of the assist drive unit, the operating device 10 can be configured to receive assist information relating to the state of the assist drive unit from the assist drive unit. For example, the operating device 10 can be configured to receive the assist information relating to the state of the assist drive unit from the assist drive unit via the wireless communicator WC1 or the wired communicator WC2.

Figure 19:
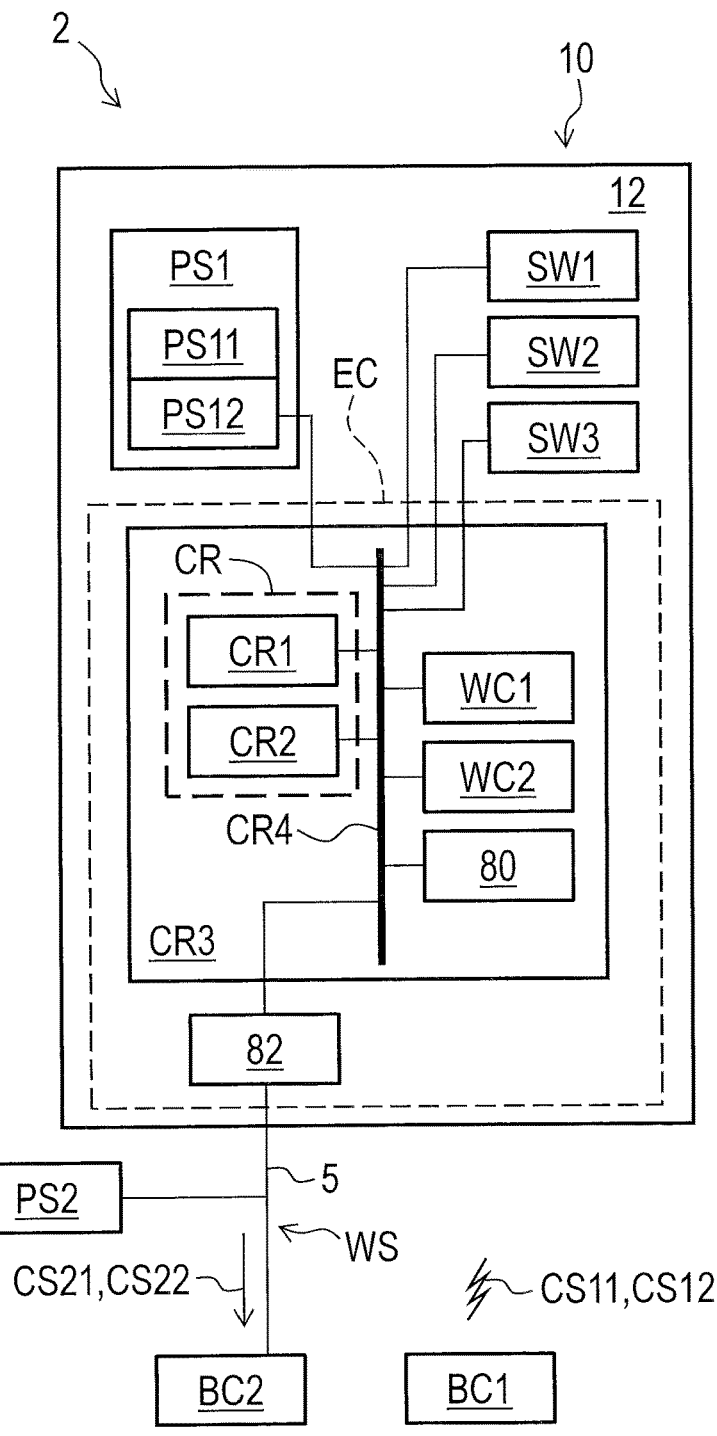
FIG. 19 is a schematic block diagram of the human-powered vehicle including the operating device illustrated in FIG. 1.

As seen in FIG. 19, the human-powered vehicle 2 can include an additional electric power source PS2 provided remotely from the electric power source PS1. In such embodiments, the additional electric power source PS2 is configured to supply electricity to an additional electric device such as the electric device BC2. The operating device 10 is electrically connected to the additional electric power source PS2 via a wired communication structure WS. The additional electric power source PS2 is configured to supply electricity to the operating device 10 via the wired communication structure WS. Thus, the operating device 10 is configured to be powered by at least one of the electric power source PS1 and the additional electric power source PS2. However, one of the electric power source PS1 and the additional electric power source PS2 can be omitted from the human-powered vehicle 2 if needed or desired. In a case where the additional electric power source PS2 is omitted, the electric device BC2 can include an electric power source.

In the embodiment depicted in FIG. 19, the electronic controller CR is configured to detect connection between the connection port 82 and an electric cable 5 of the wired communication structure WS. The electronic controller CR is configured to control the wired communicator WC2 to communicate with the electric device BC2 if the electronic controller CR detects the connection between the connection port 82 and the electric cable 5 connected to the electric device BC2. In a case where the electric device BC2 includes an additional operating device such as a satellite operating device, the electronic controller CR is configured to control another component such as the electric device BC1 based on a control signal transmitted from the electric device BC2 or other components via the electric cable 5 and the connection port 82. In a case where the electric device BC2 includes an operated component, the electronic controller CR is configured to transmit a control signal to the operated component via the connection port 82 and the electric cable 5.

Figure 20:
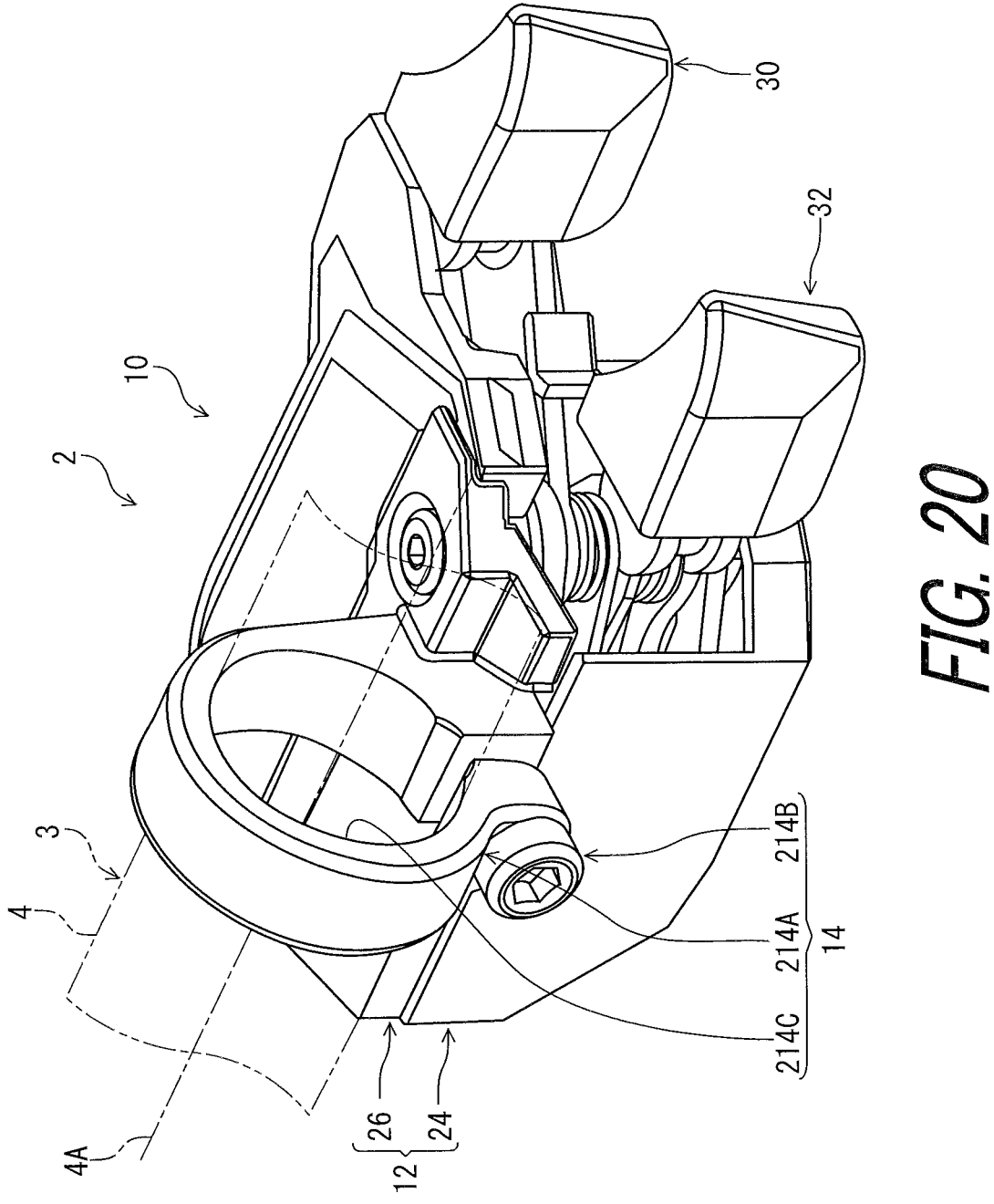
FIG. 20 is a perspective view of an operating device in accordance with a first modification.

As seen in FIG. 20, the mounting structure 14 can have other structures such as a clamp. In the modification depicted in FIG. 20, the mounting structure 14 includes a clamp body 214A and a clamp screw 214B. The clamp body

214A is provided to the second base 26 of the base 12. The clamp body 214A includes an opening 214C through which the tubular part 4 of the vehicle body 3 is to extend. The clamp body 214A is fixedly coupled to the tubular part 4 by tightening the clamp screw 214B. The mounting structure 14 can be applied to the above embodiment and the modifications thereof.

Figure 21:
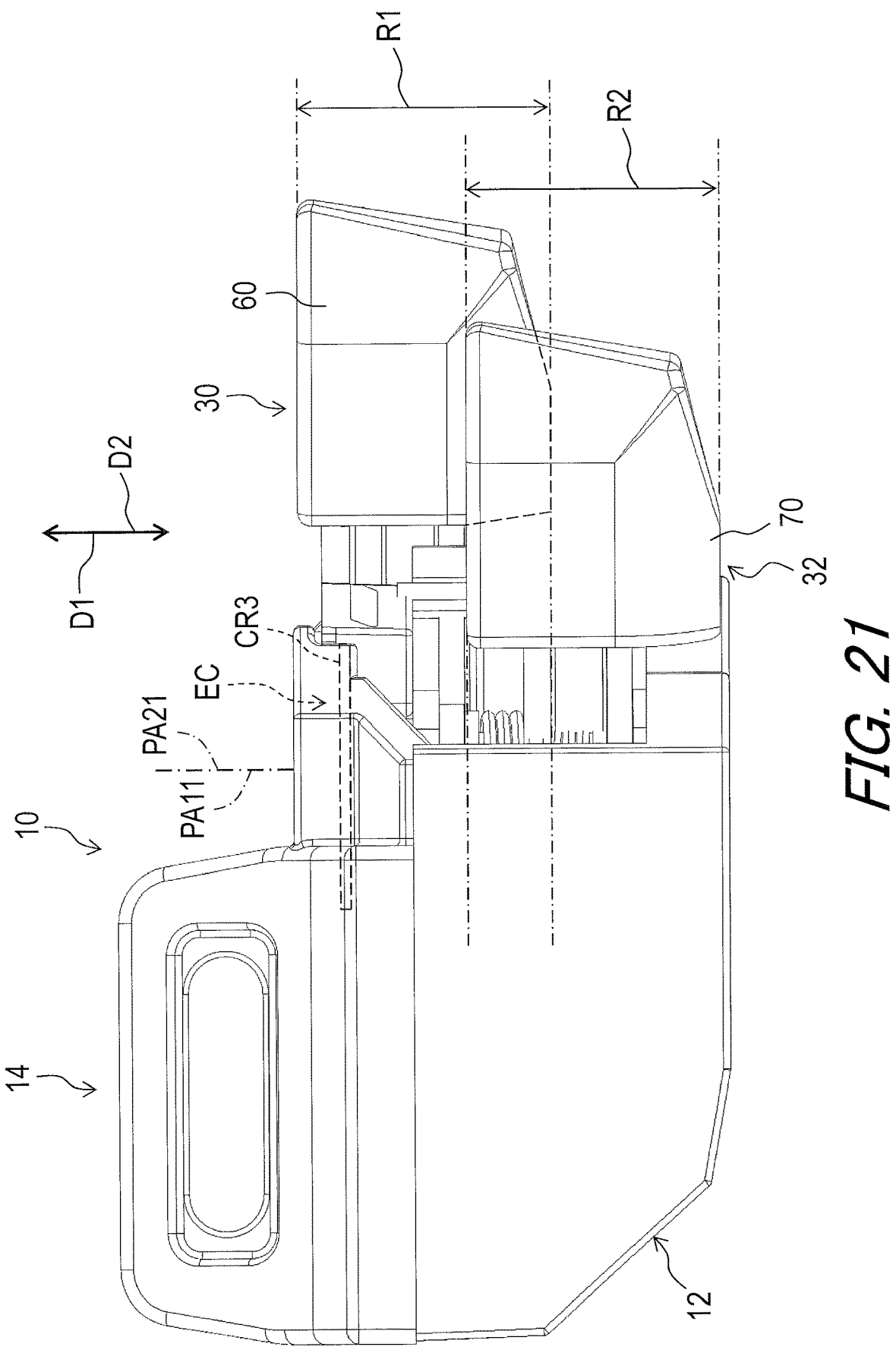
FIG. 21 is a side-elevational view of the operating device illustrated in FIG. 1.

As seen in FIG. 21, in the above embodiments and the modifications thereof, the electronic circuitry EC is overlapped with at least one of the first user input member 60 and the second user input member 70 in an axial direction D2 defined along the first pivot axis PA11. The electronic circuitry EC is offset from at least one of the first user input member 60 and the second user input member 70 in the axial direction D2 defined along the first pivot axis PA11. The circuit board CR3 of the electronic circuitry EC is overlapped with at least one of the first user input member 60 and the second user input member 70 in the axial direction D2. The circuit board CR3 is offset from at least one of the first user input member 60 and the second user input member 70 in the axial direction D2 defined along the first pivot axis PA11. For example, the electronic circuitry EC is overlapped with the first user input member 60 in the axial direction D2 while the electronic circuitry EC is offset from the second user input member 70 in the axial direction D2. The circuit board CR3 is overlapped with the first user input member 60 in the axial direction D2 while the circuit board CR3 is offset from the second user input member 70 in the axial direction D2.

The first user input member 60 defines a first region R1 defined in the axial direction D2. The second user input member 70 defines a second region R2 defined in the axial direction D2. The electronic circuitry EC is at least partially provided in the first region R1 while the electronic circuitry EC is entirely provided outside the second region R2. The electronic circuitry EC is entirely provided in the first region R1. The circuit board CR3 is at least partially provided in the first region R1 while the circuit board CR3 is entirely provided outside the second region R2. The circuit board CR3 is entirely provided in the first region R1.

Figure 22:
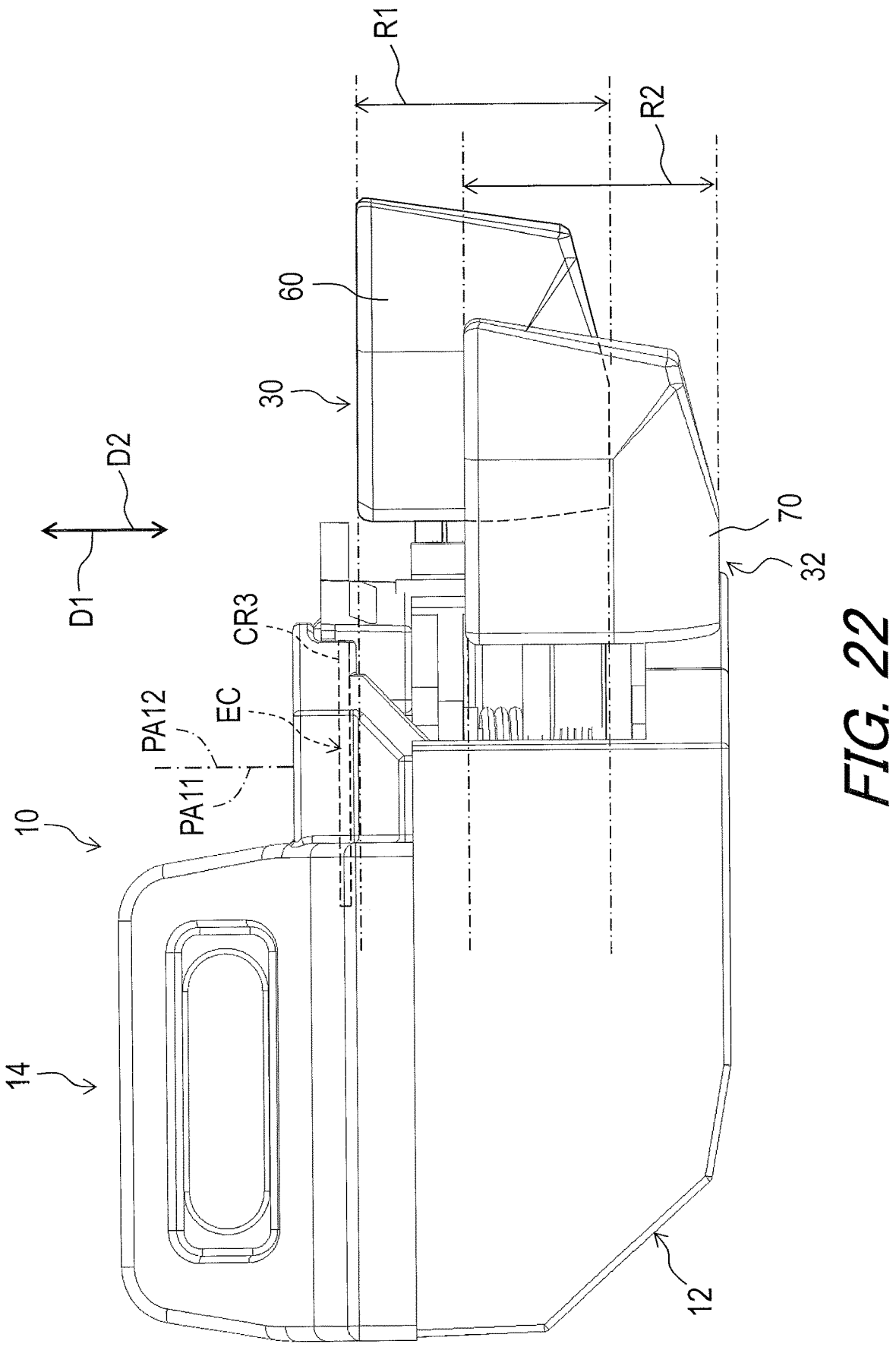
FIG. 22 is a side-elevational view of an operating device in accordance with a second modification.

As seen in FIG. 22, however, the electronic circuitry EC can be offset from both the first user input member 60 and the second user input member 70 in the axial direction D2 if needed or desired. The circuit board CR3 can be offset from both the first user input member 60 and the second user input member 70 in the axial direction D2 if needed or desired. The electronic circuitry EC can be entirely provided outside each of the first region R1 and the second region R2. The circuit board CR3 can be entirely provided outside each of the first region R1 and the second region R2.

As seen in FIG. 5, the first operating structure 30 has a first stroke length SL1. The first stroke length SL1 can be defined as an angle defined about the first pivot axis PA11. The first stroke length SL1 includes a first shorter stroke length SL11 and a first longer stroke length SL12. The first shorter stroke length SL11 is defined between the first rest position P10 and the first intermediate position P13. The first longer stroke length SL12 is defined between the first rest position P10 and the first operating position P12.

As seen in FIG. 11, the second operating structure 32 has a second stroke length SL2. The second stroke length SL2 can be defined as an angle defined about the second pivot axis PA21. The second stroke length SL2 includes a second shorter stroke length SL21 and a second longer stroke length SL22. The second shorter stroke length SL21 is defined between the second rest position P20 and the second intermediate position P23. The second longer stroke length SL22 is defined between the second rest position P20 and the second operating position P22.

In a modification depicted in FIGS. 23 to 26, the operating device 10 can further comprise a stroke changer 290. The stroke changer 290 is configured to change at least one of the first stroke length SL1 of the first operating structure 30 and the second stroke length SL2 of the second operating structure 32. The stroke changer 290 is configured to change both the first stroke length SL1 of the first operating structure 30 and the second stroke length SL2 of the second operating structure 32. However, the stroke changer 290 can be configured to change one of the first stroke length SL1 of the first operating structure 30 and the second stroke length SL2 of the second operating structure 32 if needed or desired. The operating device 10 includes the stroke changer 290 instead of the stopper 33 (see e.g., FIG. 6).

Figure 23:
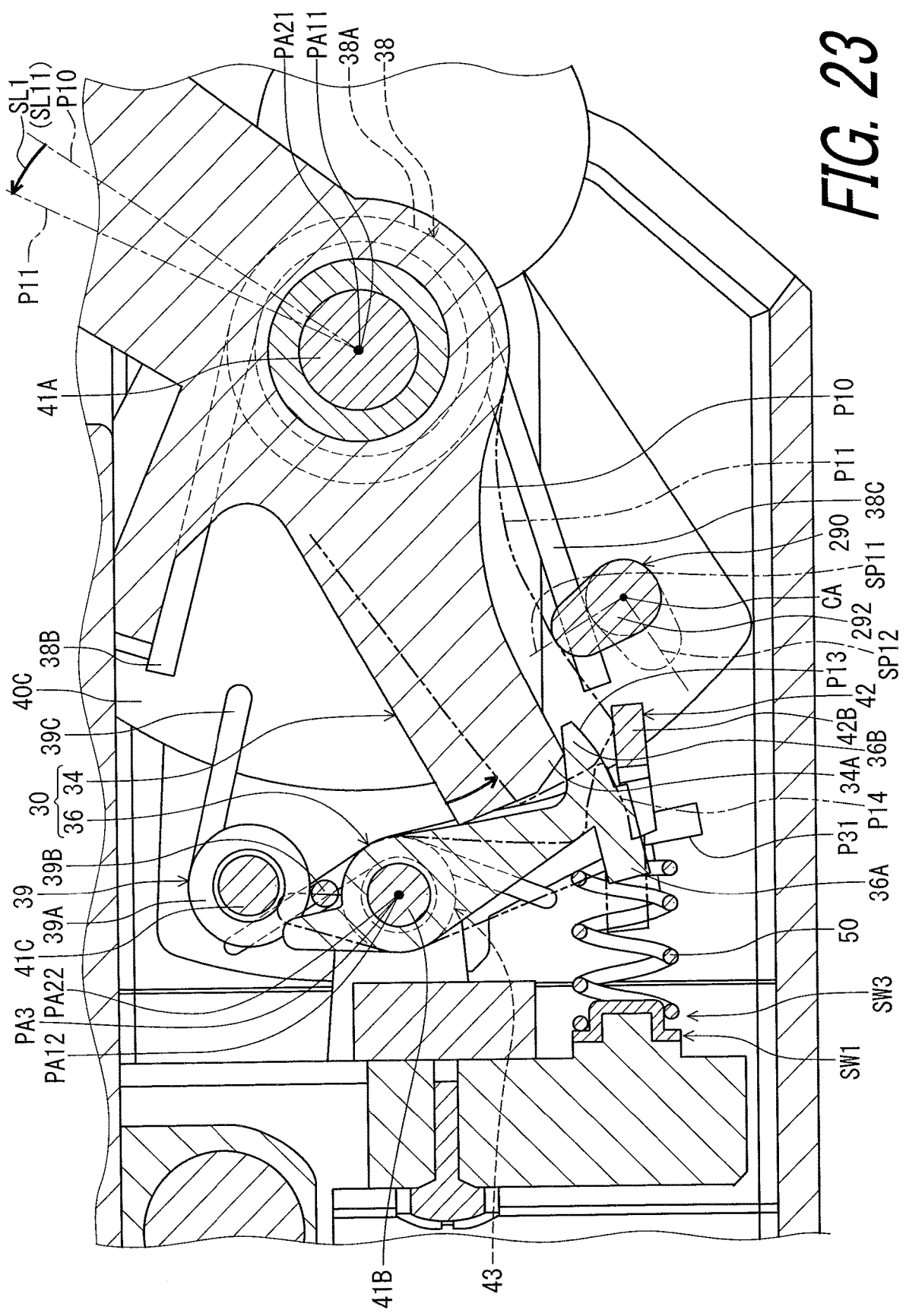
FIG. 23 is a cross-sectional view of an operating device in accordance with a third modification.
Figure 24:
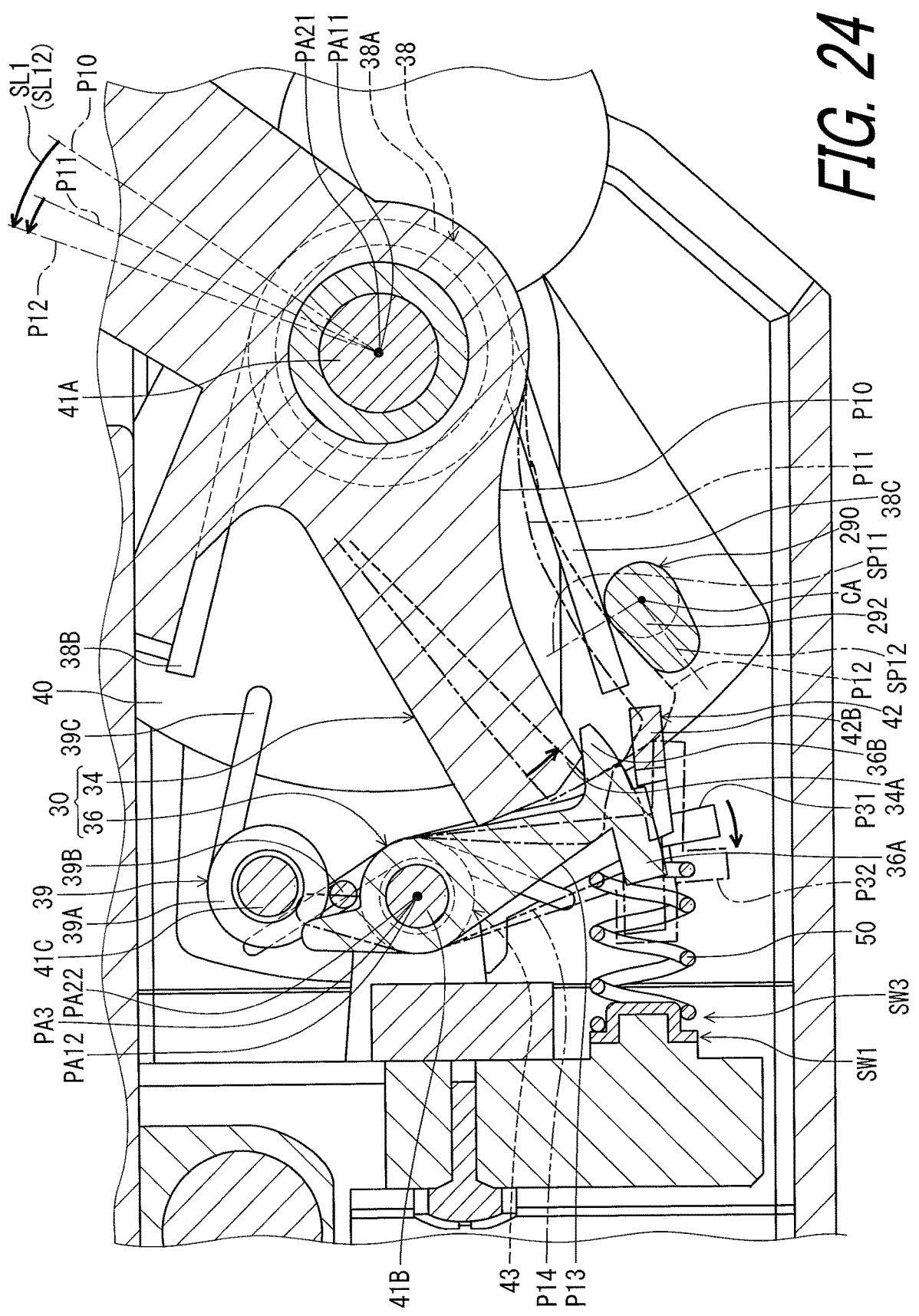
FIG. 24 is a cross-sectional view of the operating device in accordance with the third modification.

As seen in FIGS. 23 and 24, the stroke changer 290 is configured to change the first stroke length SL1 between the first shorter stroke length SL11 and the first longer stroke length SL12. As seen in FIG. 23, in a state where the stroke changer 290 sets the first stroke length SL1 to the first shorter stroke length SL11, the stroke changer 290 is configured to stop the first operating structure 30 in the first intermediate position P11 when the first operating structure 30 is moved from the first rest position P10 toward the first operating position P12. As seen in FIG. 24, in a state where the stroke changer 290 sets the first stroke length SL1 to the first longer stroke length SL12, the stroke changer 290 is configured to be free of stopping the first operating structure 30 in the first intermediate position P11 when the first operating structure 30 is moved from the first rest position P10 toward the first operating position P12.

As seen in FIG. 23, the stroke changer 290 includes a stroke changer member 292. The stroke changer member 292 is movably coupled to the base 12. The stroke changer member 292 is movable relative to the base 12 between a short-stroke position SP1 and a long-stroke position SP2. The stroke changer member 292 is pivotally coupled to the base 12 about a stroke-changer pivot axis CA. The stroke changer member 292 is pivotable relative to the base 12 about the stroke-changer pivot axis CA between the short-stroke position SP1 and the long-stroke position SP2.

As seen in FIG. 23, the stroke changer member 292 is contactable with the first operating structure 30 to stop the first operating structure 30 in the first intermediate position P11 in a state where the stroke changer member 292 is in the short-stroke position SP1 and where the first operating structure 30 is in the first intermediate position P11. The stroke changer member 292 is contactable with the first operating structure 34 to stop the first operating structure 34 in the first intermediate position P11 in a state where the stroke changer member 292 is in the short-stroke position SP1 and where the first operating structure 34 is in the first intermediate position P11.

As seen in FIG. 24, the stroke changer member 292 is configured to be free of contacting the first operating structure 30 in a state where the stroke changer member 292 is in the long-stroke position SP2 and where the first operating structure 30 is in each of the first intermediate position P11 and the first operating position P12. The stroke changer member 292 is configured to be free of contacting the first operating structure 34 in a state where the stroke changer member 292 is in the long-stroke position SP2 and where the first operating structure 34 is in each of the first intermediate position P11 and the first operating position P12.

Figure 25:
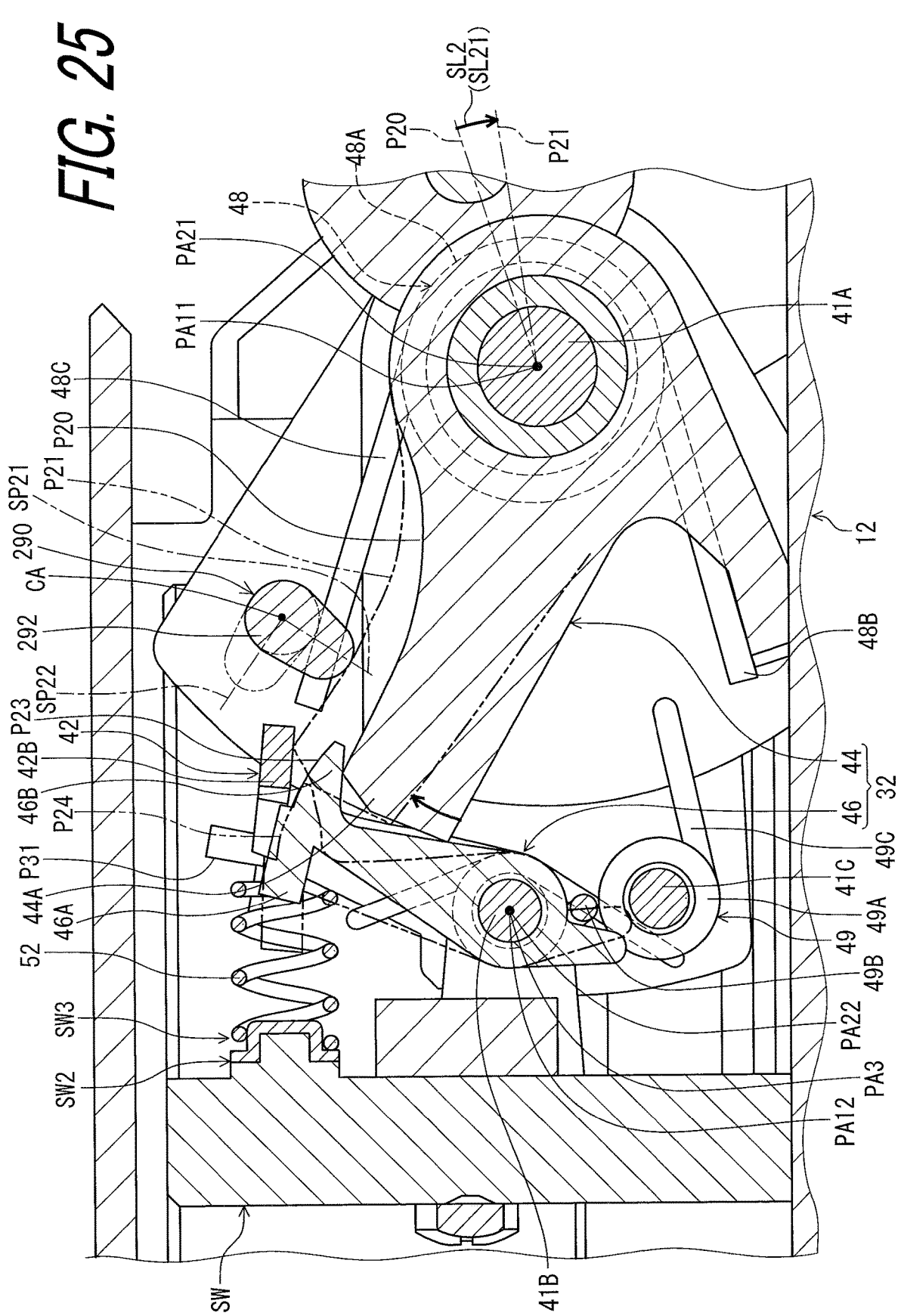
FIG. 25 is a cross-sectional view of the operating device in accordance with the third modification.
Figure 26:
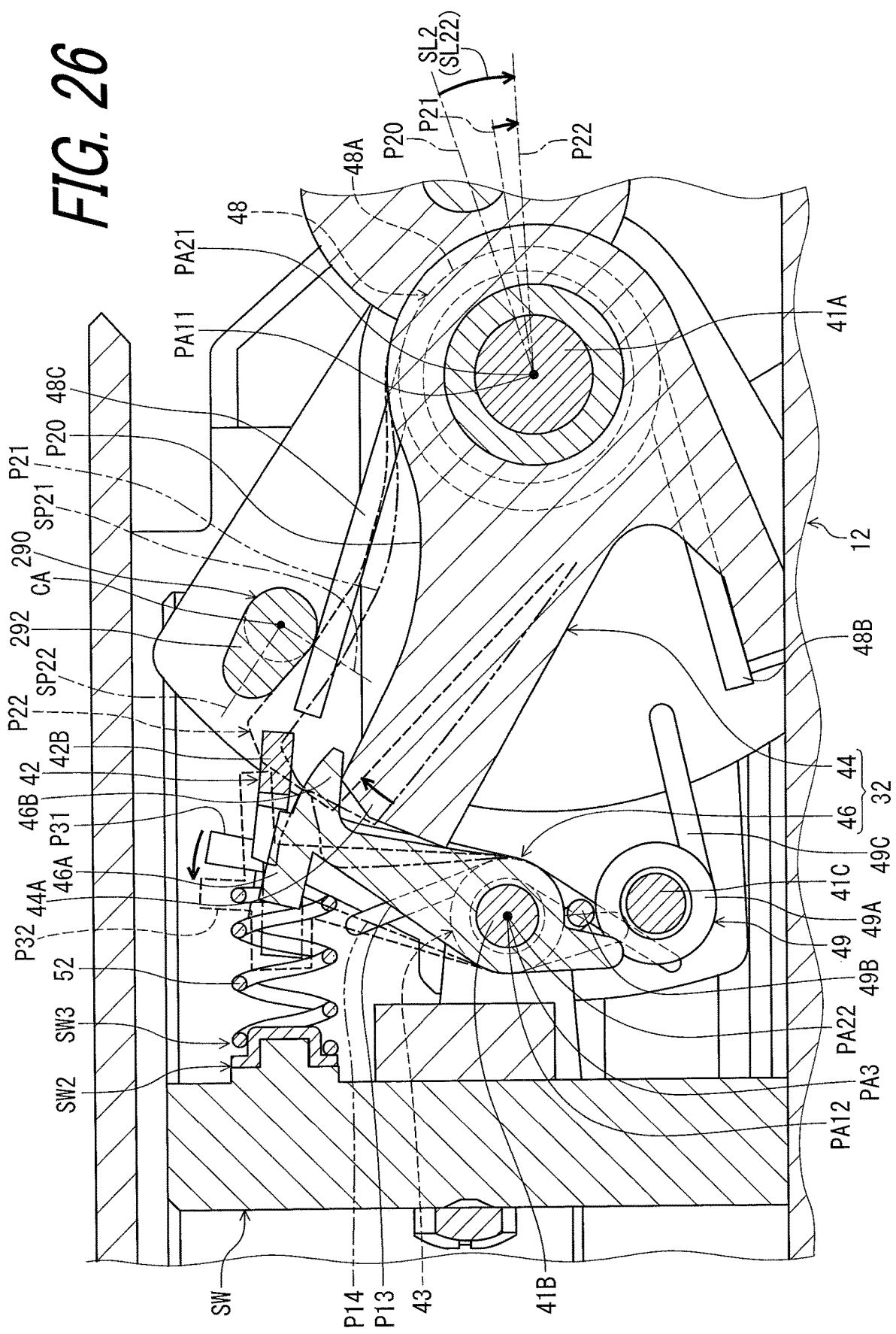
FIG. 26 is a cross-sectional view of the operating device in accordance with the third modification.

As seen in FIGS. 25 and 26, the stroke changer 290 is configured to change the second stroke length SL2 between the second shorter stroke length SL21 and the second longer stroke length SL22. As seen in FIG. 25, in a state where the stroke changer 290 sets the second stroke length SL2 to the second shorter stroke length SL21, the stroke changer 290 is configured to stop the second operating structure 32 in the second intermediate position P21 when the second operating structure 32 is moved from the second rest position P20 toward the second operating position P22. As seen in FIG. 26, in a state where the stroke changer 290 sets the second stroke length SL2 to the second longer stroke length SL22, the stroke changer 290 is configured to be free of stopping the second operating structure 32 in the second intermediate position P21 when the second operating structure 32 is moved from the second rest position P20 toward the second operating position P22.

As seen in FIG. 25, the stroke changer member 292 is contactable with the second operating structure 32 to stop the second operating structure 32 in the second intermediate position P21 in a state where the stroke changer member 292 is in the short-stroke position SP2 and where the second operating structure 32 is in the second intermediate position P21. The stroke changer member 292 is contactable with the second operating structure 44 to stop the second operating structure 44 in the second intermediate position P21 in a state where the stroke changer member 292 is in the short-stroke position SP2 and where the second operating structure 44 is in the second intermediate position P21.

As seen in FIG. 26, the stroke changer member 292 is configured to be free of contacting the second operating structure 32 in a state where the stroke changer member 292 is in the long-stroke position SP2 and where the second operating structure 32 is in each of the second intermediate position P21 and the second operating position P22. The stroke changer member 292 is configured to be free of contacting the second operating structure 44 in a state where the stroke changer member 292 is in the long-stroke position SP2 and where the second operating structure 44 is in each of the second intermediate position P21 and the second operating position P22.

Figure 27:
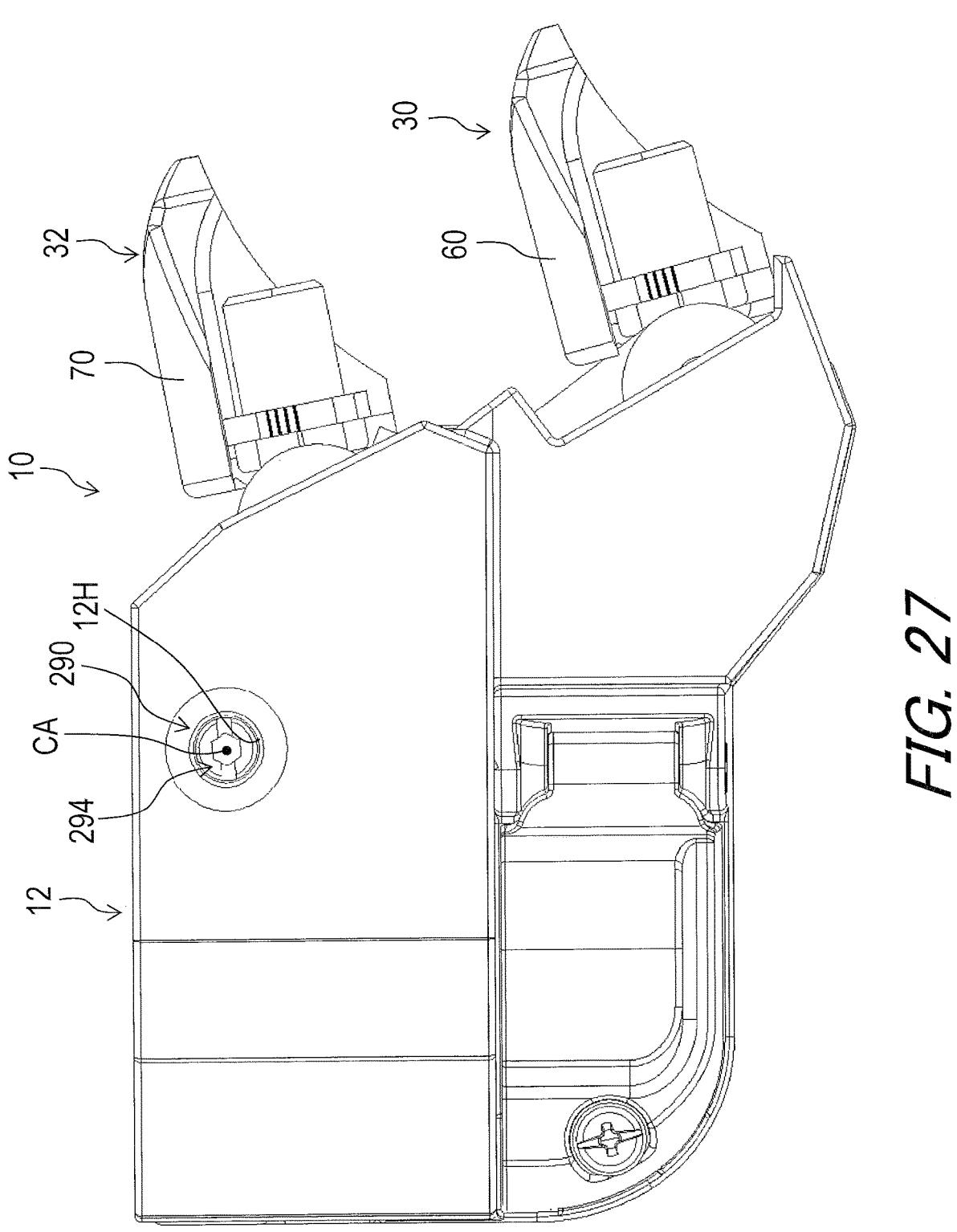
FIG. 27 is a bottom view of the operating device in accordance with the third modification.

As seen in FIG. 27, the stroke changer member 292 includes a stroke-changer operating portion 294. The stroke-changer operating portion 294 is coupled to the stroke changer member 294 to pivot integrally with the stroke changer member 294 about the stroke-changer pivot axis CA. The stroke-changer operating portion 294 is exposed from the base 12.

Figure 28:
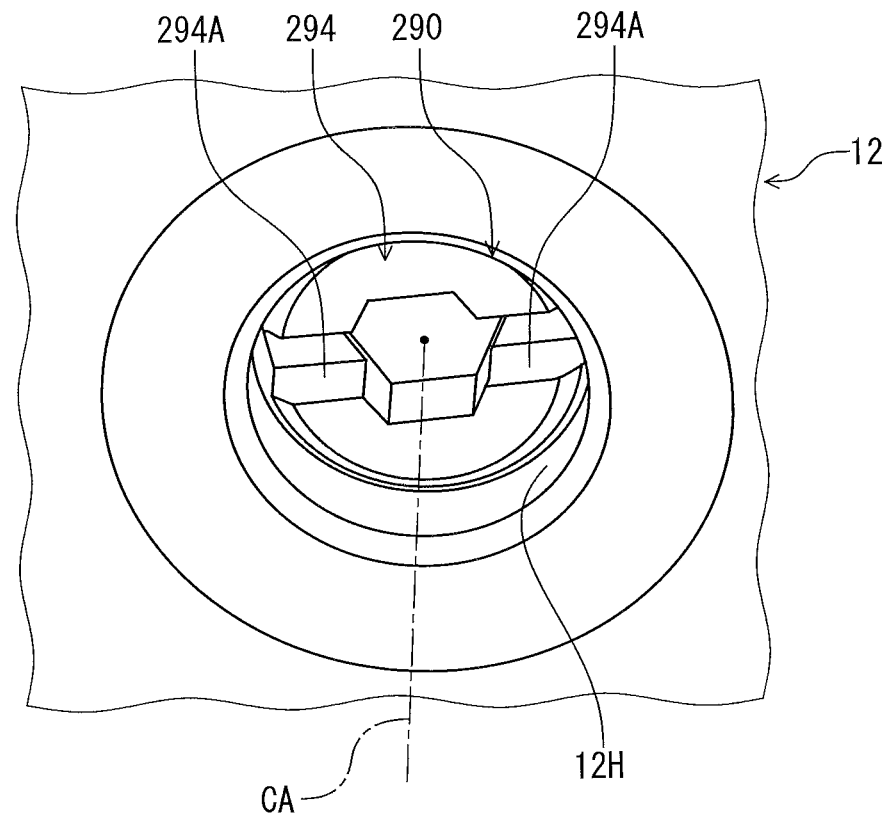
FIG. 28 is an enlarged bottom view of the operating device in accordance with the third modification.

As seen in FIG. 28, the base 12 includes a hole 12H. The stroke-changer operating portion 294 is at least partially provided in the hole 12H. The stroke-changer operating portion 294 includes at least one operating groove 294A in which a tool is to be at least partially provided. The operating groove 294A allows the user to rotate the stroke changer member 292 about the stroke-changer pivot axis CA between the short-stroke position SP1 (see e.g., FIGS. 23 and 25) and the long-stroke position SP2 (see e.g., FIGS. 24 and 26).

As seen in FIG. 29, in a state where the stroke changer 290 sets the first stroke length SL1 to the first shorter stroke length SL11, the first electric switch SW1 is activated while the third electric switch SW3 is not activated in response to the movement of the first operating structure 30. In a state where the stroke changer 290 sets the first stroke length SL1 to the first longer stroke length SL12, the first electric switch SW2 is or both the first electric switch SW2 and the third electric switch SW3 are activated in response to the movement of the first operating structure 32. Thus, the control signal CS12 is not generated while the control signal CS11 is generated in the state where the stroke changer 290 sets the first stroke length SL1 to the first shorter stroke length SL11.

In a state where the stroke changer 290 sets the second stroke length SL2 to the second shorter stroke length SL21, the second electric switch SW2 is activated while the third electric switch SW3 is not activated in response to the movement of the second operating structure 32. In a state where the stroke changer 290 sets the second stroke length SL2 to the second longer stroke length SL22, the second electric switch SW2 is or both the second electric switch SW2 and the third electric switch SW3 are activated in response to the movement of the second operating structure 32. Thus, the control signal CS22 is not generated while the control signal CS21 is generated in a state where the stroke changer 290 sets the second stroke length SL2 to the second shorter stroke length SL21.

In the modification illustrated in FIGS. 23 to 28, the first stroke length SL1 includes the first shorter stroke length SL11 and the first longer stroke length SL12. The second stroke length SL2 includes the second shorter stroke length SL21 and the second longer stroke length SL22. However, the first stroke length SL1 can include another stroke length in addition to the first shorter stroke length SL11 and the first longer stroke length SL12 if needed or desired. The second stroke length SL2 can include another stroke length in addition to the second shorter stroke length SL21 and the second longer stroke length SL22 if needed or desired.

In the present application, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have," "include" and their derivatives.

The terms "member," "section," "portion," "part," "element," "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element," and the term "second element" itself does not imply an existence of "first element."

The term "pair of," as used herein, can encompass the configuration in which the pair of elements have different shapes or structures from each other in addition to the configuration in which the pair of elements have the same shapes or structures as each other.

The terms "a" (or "an"), "one or more" and "at least one" can be used interchangeably herein.

The phrase "at least one of" as used in this disclosure means "one or more" of a desired choice. For one example, the phrase "at least one of" as used in this disclosure means "only one single choice" or "both of two choices" if the number of its choices is two. For other example, the phrase "at least one of" as used in this disclosure means "only one single choice" or "any combination of equal to or more than two choices" if the number of its choices is equal to or more than three. For instance, the phrase "at least one of A and B" encompasses (1) A alone, (2), B alone, and (3) both A and B. The phrase "at least one of A, B, and C" encompasses (1) A alone, (2), B alone, (3) C alone, (4) both A and B, (5) both B and C, (6) both A and C, and (7) all A, B, and C. In other words, the phrase "at least one of A and B" does not mean "at least one of A and at least one of B" in this disclosure.

Finally, terms of degree such as "substantially," "about" and "approximately" as used herein mean a reasonable amount of deviation of the modified term such that the end result is not significantly changed. All of numerical values described in the present application can be construed as including the terms such as "substantially," "about" and "approximately."

Obviously, numerous modifications and variations of the present invention are possible in light of the above teachings. It is therefore to be understood that within the scope of the appended claims, the invention may be practiced otherwise than as specifically described herein.

What is claimed is:

1. An operating device of a human-powered vehicle, the operating device comprising:
   a base;
   a first electric switch provided to the base;
   a second electric switch provided to the base;
   a third electric switch provided to the base;
   a first operating structure movably arranged with respect to the base to activate the first electric switch as the first operating structure moves from a first rest position to a first intermediate position and to activate the third electric switch as the first operating structure moves from the first intermediate position to a first operating position; and
   a second operating structure movably arranged with respect to the base to activate the second electric switch as the second operating structure moves from a second rest position to a second intermediate position and to activate the third electric switch as the second operating structure moves from the second intermediate position to a second operating position.

2. The operating device according to claim 1, wherein the first operating structure is movably arranged with respect to the base to activate the third electric switch as the first operating structure moves from the first intermediate position to the first operating position of the first operating structure while the first electric switch remains activated.

3. The operating device according to claim 1, wherein the second operating structure is movably arranged with respect to the base to activate the third electric switch as the second operating structure moves from the second intermediate position to the second operating position of the second operating structure while the second electric switch remains activated.

4. The operating device according to claim 1, wherein the first operating structure includes a first operating member and a first activating member, and the first activating member is movable relative to the base as the first operating member moves from the first rest position to the first intermediate position.

5. The operating device according to claim 4, further comprising an additional activating member movably arranged with respect to the base, wherein the additional activating member is movable relative to the base from a third rest position to a third operating position as the first operating member moves from the first intermediate position to the first operating position.

6. The operating device according to claim 5, wherein the second operating structure includes a second operating member, and the additional activating member is movable relative to the base from the third rest position to the third operating position as the second operating member moves from the second intermediate position to the second operating position.

7. The operating device according to claim 5, wherein the first operating member is movably arranged with respect to the base to activate the first electric switch via the first activating member as the first operating member moves from the first rest position to the first intermediate position and to activate the third electric switch via the additional activating member as the first operating member moves from the first intermediate position to the first operating position.

8. The operating device according to claim 5, wherein the second operating structure includes a second operating member and a second activating member, and the second operating member is movably arranged with respect to the base to activate the second electric switch via the second activating member as the second operating member moves from the second rest position to the second intermediate position and to activate the third electric switch via the additional activating member as the second operating member moves from the second intermediate position to the second operating position.

9. The operating device according to claim 5, wherein the first operating structure includes a first activation portion,
the second operating structure includes a second activation portion,
the additional activating member includes an additional activation portion,
the first activation portion is movable toward the first electric switch as the first operating structure moves from the first rest position to the first intermediate position,
the second activation portion is movable toward the second electric switch as the second operating structure moves from the second rest position to the second intermediate position,
the additional activation portion is movable toward the third electric switch as the first operating structure moves from the first intermediate position to the first operating position, and
the additional activation portion is movable toward the third electric switch as the second operating structure moves from the second intermediate position to the second operating position.

10. The operating device according to claim 5, wherein the first operating member is pivotally coupled to the base about a first pivot axis, and
the first activating member is pivotally coupled to the base about a first additional pivot axis.

11. The operating device according to claim 10, wherein the first additional pivot axis is offset from the first pivot axis.

12. The operating device according to claim 10, wherein the additional activating member is pivotally coupled to the base about a third pivot axis, and
the third pivot axis is coincident with the first additional pivot axis.

13. The operating device according to claim 5, wherein the second operating structure includes a second operating member and a second activating member,
the second operating member is pivotally coupled to the base about a second pivot axis, and the second activating member is pivotally coupled to the base about a second additional pivot axis.

14. The operating device according to claim 13, wherein the second additional pivot axis is offset from the second pivot axis.

15. The operating device according to claim 13, wherein the first operating member is pivotally coupled to the base about a first pivot axis,
the first activating member is pivotally coupled to the base about a first additional pivot axis, and
the first pivot axis is coincident with the second pivot axis.

16. The operating device according to claim 15, wherein the first additional pivot axis is parallel to the first pivot axis.

17. The operating device according to claim 15, wherein the additional activating member is pivotally coupled to the base about a third pivot axis, and
the third pivot axis is coincident with at least one of the first additional pivot axis and the second additional pivot axis.

18. The operating device according to claim 5, wherein the second operating structure includes a second operating member and a second activating member,
the additional activating member is movable with respect to the base in response to a movement of the first operating member, and
the additional activating member is movable with respect to the base in response to a movement of the second operating member.

19. The operating device according to claim 18, wherein the first activating member includes a first contacting part,
the first operating member includes a second contacting part,
the additional activating member includes an additional contacting part,
the first contacting part is contactable with the second contacting part in response to the movement of the first operating member, and
the additional contacting part is contactable with the second contacting part in response to the movement of the first operating member.

20. The operating device according to claim 19, wherein the second activating member includes a third contacting part,
the second operating member includes a fourth contacting part,
the third contacting part is contactable with the fourth contacting part in response to the movement of the second operating member, and
the additional contacting part is contactable with the fourth contacting part in response to the movement of the second operating member.

21. The operating device according to claim 5, wherein the first operating structure is at least partially spaced apart from the second operating structure in an arrangement direction, and
the additional activating member is at least partially provided between the first operating structure and the second operating structure in the arrangement direction.

22. The operating device according to claim 1, wherein the second operating structure includes a second operating member and a second activating member, and
the second activating member is movable relative to the base as the second operating member moves from the second rest position to the second intermediate position.

23. The operating device according to claim 1, wherein the first operating structure is movable relative to the base independently from the second operating structure between the first rest position and the first operating position without moving the second operating structure, and the second operating structure is movable relative to the base independently from the first operating structure between the second rest position and the second operating position without moving the first operating structure.

24. The operating device according to claim 1, wherein the first operating structure is at least partially spaced apart from the second operating structure in an arrangement direction, and the first electric switch, the second electric switch, and the third electric switch are arranged in the arrangement direction.

25. The operating device according to claim 1, further comprising electronic circuitry configured to be electrically connected to the first electric switch, the second electric switch, and the third electric switch, wherein the first operating structure includes a first user input member and a first pivot axis, the second operating structure includes a second user input member, and the electronic circuitry is offset from at least one of the first user input member and the second user input member in an axial direction defined along the first pivot axis.

26. The operating device according to claim 1, wherein the first operating structure includes a first user input member and a first pivot axis, the second operating structure includes a second user input member, and the electronic circuitry is overlapped with at least one of the first user input member and the second user input member in an axial direction defined along the first pivot axis.

27. The operating device according to claim 1, further comprising a stroke changer configured to change at least one of a first stroke length of the first operating structure and a second stroke length of the second operating structure.

28. The operating device according to claim 27, wherein the first stroke length includes a first shorter stroke length and a first longer stroke length, the first shorter stroke length is defined between the first rest position and the first intermediate position, the first longer stroke length is defined between the first rest position and the first operating position, and the stroke changer is configured to change the first stroke length between the first shorter stroke length and the first longer stroke length.

* * * * *